(12) United States Patent
Samec et al.

(10) Patent No.: US 10,851,245 B2
(45) Date of Patent: Dec. 1, 2020

(54) POLYMERIC MATERIAL COMPRISING MODIFIED LIGNIN

(71) Applicant: Ren Com AB, Stockholm (SE)

(72) Inventors: Joseph Samec, Stockholm (SE); Christopher Carrick, Danderyd (SE); Alexander Orebom, Uppsala (SE); Joakim Löfstedt, Uppsala (SE)

(73) Assignee: REN COM AB

( * ) Notice: Subject to any disclaimer, the term of this patent is extended or adjusted under 35 U.S.C. 154(b) by 10 days.

(21) Appl. No.: 16/312,255

(22) PCT Filed: Dec. 15, 2017

(86) PCT No.: PCT/SE2017/051282
§ 371 (c)(1),
(2) Date: Dec. 20, 2018

(87) PCT Pub. No.: WO2018/111183
PCT Pub. Date: Jun. 21, 2018

(65) Prior Publication Data
US 2019/0233648 A1 Aug. 1, 2019

(30) Foreign Application Priority Data

Dec. 15, 2016 (SE) ....................... 1651653
Jun. 9, 2017 (SE) ....................... 1750733

(51) Int. Cl.
| C08L 97/00 | (2006.01) |
| C08L 33/20 | (2006.01) |
| C08L 67/00 | (2006.01) |
| C08L 23/00 | (2006.01) |
| B29C 45/00 | (2006.01) |
| B29C 45/78 | (2006.01) |
| C08H 7/00 | (2011.01) |
| C08L 23/06 | (2006.01) |
| C08L 23/12 | (2006.01) |
| C08L 67/02 | (2006.01) |
| C08L 69/00 | (2006.01) |
| B29K 23/00 | (2006.01) |
| B29K 33/20 | (2006.01) |
| B29K 67/00 | (2006.01) |
| B29K 269/00 | (2006.01) |

(52) U.S. Cl.
CPC ........ *C08L 97/005* (2013.01); *B29C 45/0001* (2013.01); *B29C 45/78* (2013.01); *C08H 6/00* (2013.01); *C08L 23/00* (2013.01); *C08L 23/06* (2013.01); *C08L 23/12* (2013.01); *C08L 33/20* (2013.01); *C08L 67/00* (2013.01); *C08L 67/02* (2013.01); *C08L 69/00* (2013.01); *B29C 2045/0091* (2013.01); *B29K 2023/06* (2013.01); *B29K 2023/12* (2013.01); *B29K 2033/20* (2013.01); *B29K 2067/003* (2013.01); *B29K 2093/00* (2013.01); *B29K 2269/00* (2013.01); *C08L 2205/08* (2013.01)

(58) Field of Classification Search
CPC ................ C08L 7/00; C08H 6/00; C07G 1/00
See application file for complete search history.

(56) References Cited

U.S. PATENT DOCUMENTS

| 4,265,809 A * | 5/1981 | Holsopple ............... C08G 59/02 523/400 |
| 6,172,204 B1 | 1/2001 | Sarkanen et al. |
| 2008/0003443 A1* | 1/2008 | Oya ........................ B29C 41/24 428/532 |
| 2010/0204368 A1 | 8/2010 | Benko et al. |
| 2011/0000399 A1* | 1/2011 | Hauk ...................... C04B 24/08 106/661 |
| 2012/0097194 A1* | 4/2012 | McDaniel ................ C09D 5/14 134/26 |
| 2012/0302699 A1* | 11/2012 | Kobune ............... C08G 59/621 525/54.42 |
| 2013/0231295 A1 | 9/2013 | Gu |
| 2013/0292615 A1* | 11/2013 | Brizius .................... C08H 6/00 252/601 |
| 2014/0121307 A1* | 5/2014 | Cao ........................ C08L 23/12 524/73 |
| 2014/0171379 A1* | 6/2014 | Jansen ..................... C07G 1/00 514/22 |
| 2014/0275435 A1* | 9/2014 | Holmberg ........... C08F 293/005 525/401 |
| 2016/0002467 A1 | 1/2016 | Erdmann et al. |

(Continued)

FOREIGN PATENT DOCUMENTS

| WO | 2015/016857 | 2/2015 |
| WO | 2015/094098 | 6/2015 |

(Continued)

OTHER PUBLICATIONS

Anwer et al., "Comparison of the thermal, dynamic mechanical and morphological properties of PLA-Lignin & PLA-Tannin particulate green composites", Composites Part B, 32 (2015) 92-99.
Aradoaei et al., "Modified lignin effectiveness as compatibilizer for PET/LDPE blends containing secondary materials", Journal of Non-Crystalline Solids 356 (2010) 768-771.
Chen et al., "Physical Properties of Lignin-Based Polypropylene Blends", Polymer Composites, 32:1019-1025 (2011).
Chen et al., "Physical Properties of Lignin-Based Polypropylene Blends", Polymer Composites—2011, DOI 10.1002/pc., 1019-1025.

(Continued)

*Primary Examiner* — Liam J Heincer
(74) *Attorney, Agent, or Firm* — Adsero IP

(57) ABSTRACT

A polymeric material comprising a first polymer and a second polymer where the first polymer is a natural or a synthetic polymer and the second polymer is modified lignin. The modified lignin is modified with an alkyl containing group via linker wherein the linker is an ether group and wherein the alkyl containing group is derived from fatty acid methyl ester.

25 Claims, 20 Drawing Sheets

(56) References Cited

U.S. PATENT DOCUMENTS

| | | | | |
|---|---|---|---|---|
| 2016/0312029 A1* | 10/2016 | Samec | ............... | C07G 1/00 |
| 2017/0298192 A1* | 10/2017 | Samec | ............... | C08H 6/00 |
| 2018/0142177 A1* | 5/2018 | Dahlstrand | ............ | C08H 6/00 |
| 2018/0371252 A1* | 12/2018 | Carrick | ............ | C08L 97/005 |
| 2019/0127532 A1* | 5/2019 | Samec | ............... | C08L 23/00 |

FOREIGN PATENT DOCUMENTS

| | | |
|---|---|---|
| WO | 2015/138996 | 9/2015 |
| WO | 2016/072915 | 5/2016 |
| WO | 2016/204682 | 12/2016 |

OTHER PUBLICATIONS

Dehne et al., "Esterification of Kraft lignin as a method to improve structural and mechanical properties of lignin-polyethylene blends", Journal of Appl. Polym. Sci. 2017, 134, 8 pages.

Dehne et al., "Influence of lignin source and esterification on properties of lignin-polyethylene blends", Industrial Crops and Products 86 (2016) 320-328.

Doherty et al., "Value-adding to cellulosic ethanol: Lignin polymers", Industrial Crops and Products 33 (2011) 259-276.

Duval et al., "A review on lignin-based polymeric, micro- and nano-structured materials", Reactive & Functional Polymers 85 (2014) 78-96.

International Search Report for PCT/SE2017/051282, dated Mar. 16, 2018, 5 pages.

Maldhure et al., "Mechanical Properties of Polypropylene Blended with Esterified and Alkylated Lignin", Journal of Applied Polymer Science, vol. 125, 1701-1712 (2012).

Naseem et al., "Lignin-derivatives based polymers, blends and composites: A review", International Journal of Biological Macromolecules 93 (2016) 296-313.

Pawar et al., "Engineering physical and chemical properties of softwood kraft lignin by fatty acid substitution", Industrial Crops and Products 89 (2016) 128-134.

Sailaja et al., "Mechanical and thermal properties of compatibilized composites of polyethylene and esterified lignin", Materials and Design 31 (2010) 4369-4379.

Ye et al., "Antioxidant and Thermal Stabilization of Polypropylene by Addition of Butylated Lignin at Low Loadings", ACS Sustainable Chem. Eng. 2016, 4, 5248-5257.

* cited by examiner

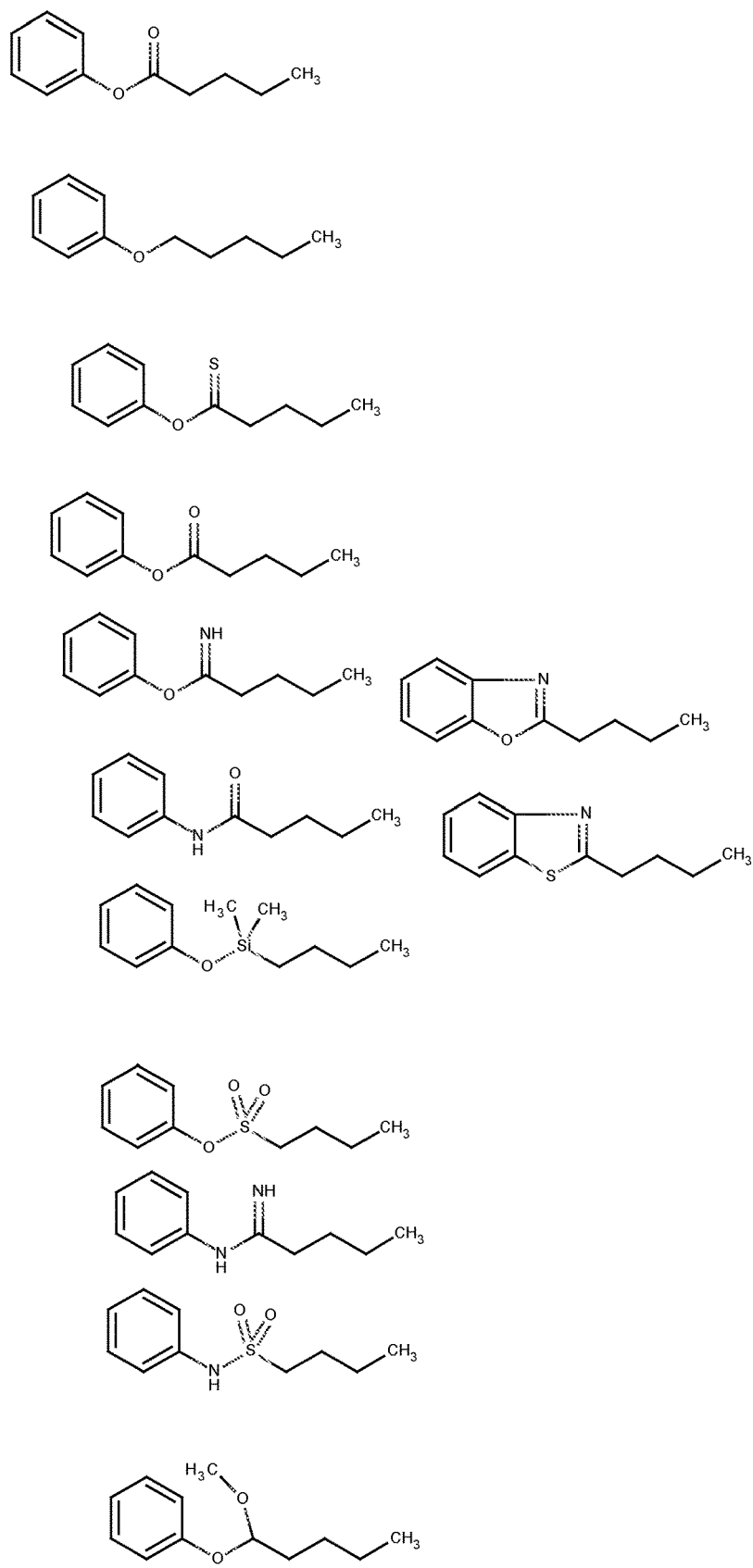
Figure 16. =>continues

POLYMERIC MATERIAL COMPRISING MODIFIED LIGNIN

CROSS-REFERENCE TO RELATED APPLICATION

This application claims priority to and is a 35 U.S.C. § 371 national phase application of PCT/SE2017/051282 (WO2018/111183), filed on Dec. 15, 2017 entitled "POLYMERIC MATERIAL COMPRISING MODIFIED LIGNIN", which application claims priority to and the benefit of Sweden Patent Application Nos. 1651653-6, filed Dec. 15, 2016 and 1750733-6, filed Jun. 9, 2017, the disclosures of which are incorporated herein by reference in their entirety.

FIELD OF THE INVENTION

The present invention relates to a polymeric material comprising modified lignin. The material may be injection moulded and exhibits very good mechanical properties.

BACKGROUND

There is a need for more renewable plastic materials and lignin is potential polymer to be used. However a problem with lignin is its miscibility and compatibility with other polymer such as polyolefins.

Lignin is the most available natural polymer next to cellulose. Lignin is found in the cell walls of fibrous plants and woods along with cellulose and hemicellulose. Lignin acts as a matrix material for polysaccharides, micro-fibrils and fibres and provides strength to plant stem. It is a high molecular weight phenolic macromolecule containing three different types of monolignol monomers p-coumaryl alcohol, coniferyl alcohol and sinapyl alcohol.

WO2015/168571 discloses functionalized lignin that may be used in thermoplastics. The lignin is functionalized during reactive extraction leading using for example ethanol and an acid. Still there is no disclosure how the functionalized lignin may be used together with a thermoplastic.

In order for a polymer or polymer mixture to be processed by compression moulding or injection moulding it should be thermally stable at elevated temperatures. This is a problem for many natural polymers even when they have been modified.

SUMMARY OF THE INVENTION

The aim of the present invention is to overcome the drawbacks of the prior art and present a material comprising a renewable source, lignin, and where the material may be processed using conventional techniques such as extrusion and injection moulding.

In a first aspect the present invention relates to a polymeric material comprising a first polymer and a second polymer wherein the first polymer is a natural or a synthetic polymer and the second polymer is modified lignin;

wherein the modified lignin is modified by alkylation of the lignin via a linker wherein the linker is selected from an ether, ester, ketone, acetal, methylene, methyne, olefin, amide, thioester, thioether, imide, imidamide, carbamate, carbamothioic acid, sulfonyl, sulfonamide, silyl oxy, silyl ether, phenoxide, furan, phosphorous acid, quaternary ammonium or hetero cycles; preferably wherein the modified lignin is modified with an alkyl containing group via a linker wherein the linker is an ether group and wherein the alkyl containing group is derived from fatty acid methyl ester.

In a second aspect the present invention relates to an injection moulded or extruded product comprising the polymeric material according to the present invention.

In a third aspect the present invention relates to a compatibilizer comprising modified lignin wherein the modified lignin is modified by alkylation of the lignin via a linker wherein the linker is selected from an ether, ester, ketone, acetal, methylene, methyne, olefin, amide, thioester, thioether, imide, imidamide, carbamate, carbamothioic acid, sulfonyl, sulfonamide, silyl oxy, silyl ether, phenoxide, furan, phosphorous acid, quaternary ammonium or hetero cycles; preferably wherein the modified lignin is modified with an alkyl containing group via a linker wherein the linker is an ether group and wherein the alkyl containing group is derived from fatty acid methyl ester.

In a fourth aspect the present invention relates to a method of extruding the material according to the present invention comprising:

mixing the first polymer and the second polymer and optionally a compatibilizer wherein the first polymer is a natural or a synthetic polymer and the second polymer is modified lignin; and extruding the formed mixture at a temperature of at least 100° C., preferably at least 170° C. or at least 180° C.;

optionally cutting the extruded material into pellets; and drying the obtained extruded material.

In a fifth aspect the present invention relates to a method of injection moulding a product of the material according to the present invention wherein the method comprises:

providing pellets or powder of the present material; and injection moulding the pellets or powder into a desired shape at a temperature of at least 100° C., preferably at least 180° C. or at least 200° C.

All the embodiments herein are applicable to all the aspects.

DETAILED DESCRIPTION OF THE INVENTION

Figure 18:
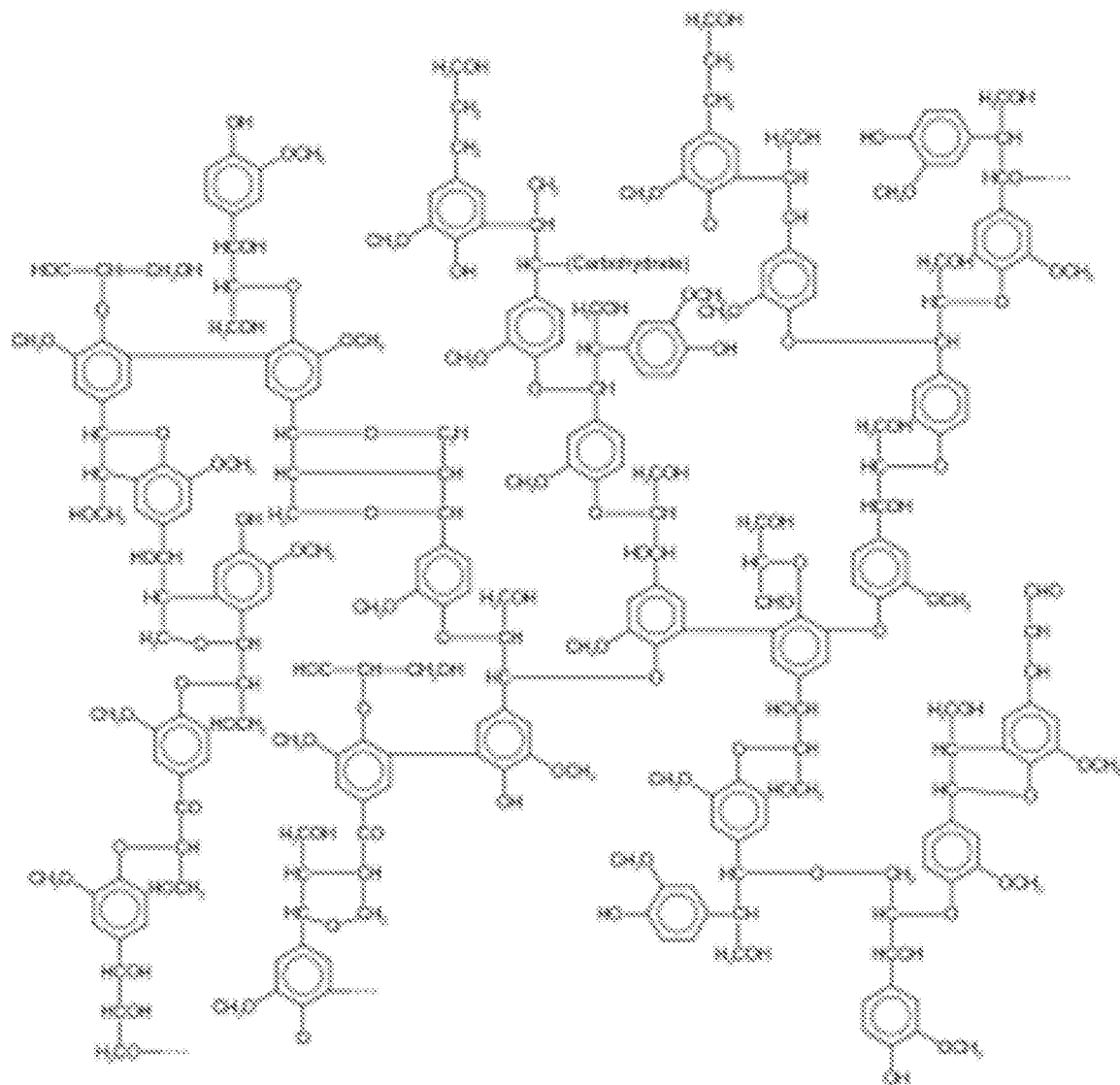

In the present application the term "lignin" means a polymer comprising coumaryl alcohol, coniferyl alcohol and sinapyl alcohol monomers. FIG. 18 discloses a schematic picture of a part of lignin.

In the present application the term "linker" or "linker group" are used interchangeably and means any group which can connect lignin with an alkyl containing group. Non-limiting examples of a linker is ester, ether, amide and carbamide.

In the present application the term "compatibilizer" denotes a compound that promotes adhesion between polymers which otherwise are less compatible. Compatibilizers are widely used to increase the miscibility of otherwise immiscible polymers or polymers that do not mix so well.

Lignin

The lignin according to the present invention is obtained from any suitable biomass. A schematic structure of lignin is seen in FIG. 18. The biomass may be treated with pulping processes or organosols processes for example. Biomass includes, but is not limited to wood, fruits, vegetables, processing waste, chaff, grain, grasses, corn, corn husks, weeds, aquatic plants, hay, paper, paper products, recycled paper, shell, brown coal, algae, straw, bark or nut shells, lignocellulosic material, lignin and any cellulose containing biological material or material of biological origin. In one embodiment the biomass is wood, preferably particulate wood such as saw dust or wood chips. The wood may be any kind of wood, hard or soft wood, coniferous tree or broad-leaf tree. A non-limiting list of woods would be pine, birch, spruce, maple, ash, mountain ash, redwood, alder, elm, oak, larch, yew, chestnut, olive, cypress, banyan, sycamore, cherry, apple, pear, hawthorn, *magnolia, sequoia*, walnut, karri, coolabah and beech.

It is preferred that the biomass contains as much lignin as possible. The Kappa number estimates the amount of chemicals required during bleaching of wood pulp in order to obtain a pulp with a given degree of whiteness. Since the amount of bleach needed is related to the lignin content of the pulp, the Kappa number can be used to monitor the effectiveness of the lignin-extraction phase of the pulping process. It is approximately proportional to the residual lignin content of the pulp.

$$K \approx c*l$$

K: Kappa number; c: constant 6.57 (dependent on process and wood); l: lignin content in percent. The Kappa number is determined by ISO 302:2004. The kappa number may be 20 or higher, or 40 or higher, or 60 or higher. In one embodiment the kappa number is 10-100.

The biomass material may be a mixture of biomass materials and in one embodiment the biomass material is black or red liquor, or materials obtained from black or red liquor. Black and red liquor contains cellulose, hemi cellulose and lignin and derivatives thereof. The composition according to the present invention may comprise black or red liquor, or lignin obtained from black or red liquor.

Black liquor comprises four main groups of organic substances, around 30-45 weight % ligneous material, 25-35 weight % saccharine acids, about 10 weight % formic and acetic acid, 3-5 weight % extractives, about 1 weight % methanol, and many inorganic elements and sulphur. The exact composition of the liquor varies and depends on the cooking conditions in the production process and the feedstock. Red liquor comprises the ions from the sulfite process (calcium, sodium, magnesium or ammonium), sulfonated lignin, hemicellulose and low molecular resins.

The lignin according to the present invention may be Kraft lignin (lignin obtained from the Kraft process), sulfonated lignin, Lignoboost® lignin, precipitated lignin, filtrated lignin, acetosolv lignin or organosolv lignin. In one embodiment the lignin is Kraft lignin, acetosolv lignin or organosolv lignin. In another embodiment the lignin is Kraft lignin. In another embodiment the lignin is organosolv lignin. In another embodiment the lignin obtained as residual material from ethanol production. The lignin may be in particulate form with a particle size of 5 mm or less, or 1 mm or less.

Native lignin or Kraft lignin is not soluble in most organic solvents, fatty acids or oils. Instead prior art have presented various techniques to depolymerize and covert the depolymerized lignin into components soluble in the wanted media.

The weight average molecular weight (mass) ($M_w$) of the lignin according to the present invention may be 30,000 g/mol or less, such as not more than 20,000 g/mol, or not more than 10,000 g/mol, or not more than 5,000 g/mol, or not more than 2,000 g/mol, but preferably higher than 1,000 g/mol, or higher than 1,200 g/mol, or higher than 1,500 g/mol. In one embodiment the number average molecular weight of the lignin is between 1,000 and 4,000 g/mol, or between 1,500 and 3,500 g/mol.

Modified or Derivatized Lignin

The lignin according to the present invention is modified or derivatized with an alkyl containing group. The alkyl containing group may be but is not limited to an alkyl group, an alkyl ester, an alkyl ether or any other group comprising an alkyl group or section or block. The alkyl containing group is connected to the lignin via a linker group which is derived from a hydroxyl group or connected to an aryl group on the lignin according to the following schematic chemical structures:

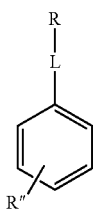

1

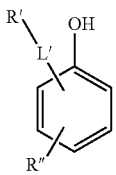

2

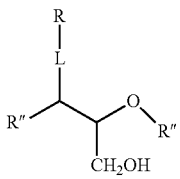

where the lignin is schematically represented by the R" and the aryl (structure 1 and 2) or aliphatic (structure 3) groups respectively, L and L' are the linkers and R and R' are the alkyl containing groups. Since lignin has aliphatic hydroxyl groups as well as aromatic hydroxyl groups the linker L may be at an aliphatic part of lignin (structure 3). The linker L' may also be connected direct to the aryl group in lignin, i.e. not via a hydroxyl group (structure 2). R" may be hydrogen, alkyl, aryl or alkoxy group or any other group found in lignin. The aryl group of the lignin may comprise more than one R".

Figure 16:
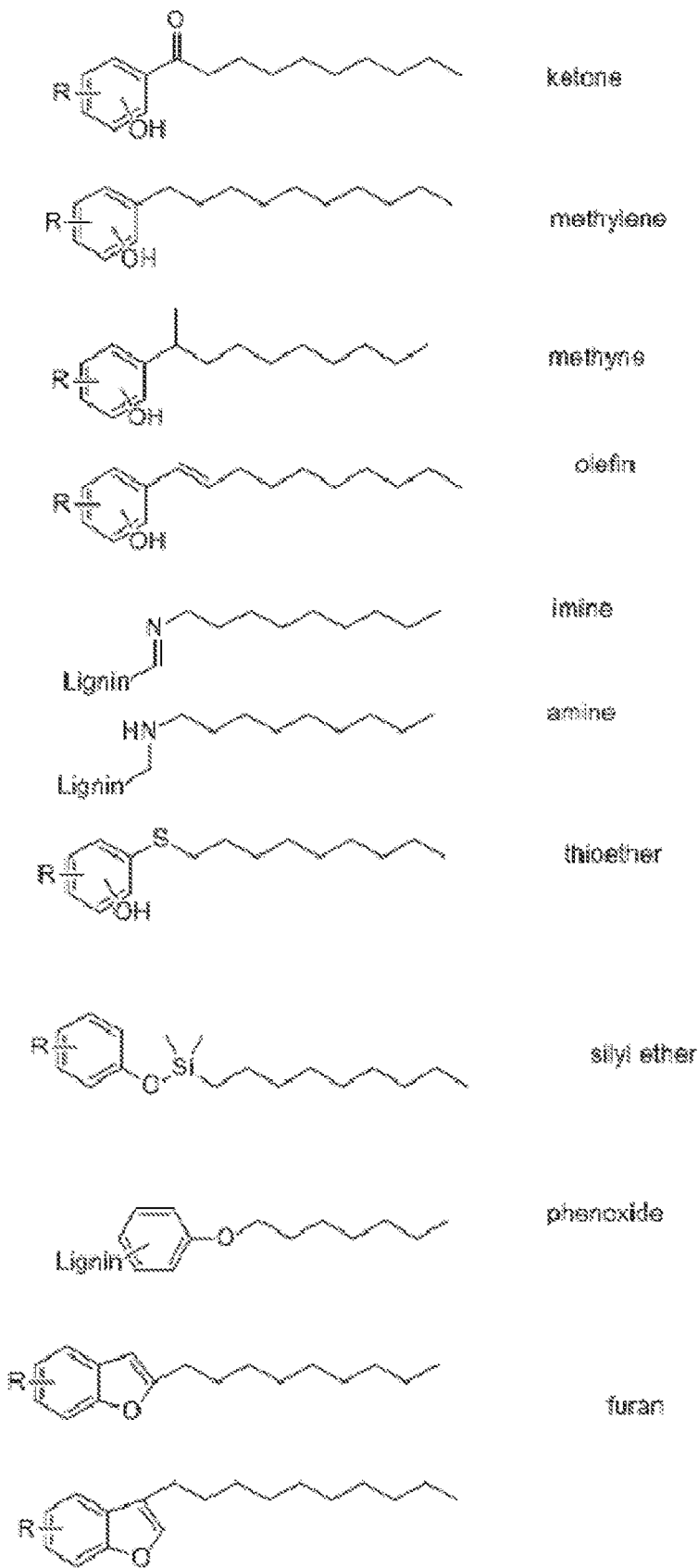
Figure 19:
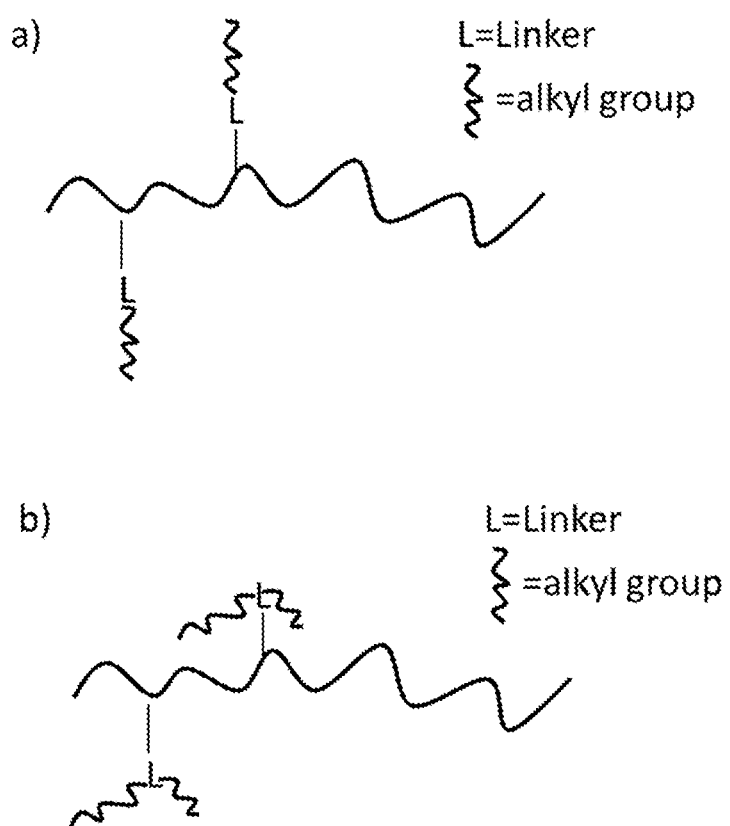

The linker (L) may be an ether, ester, ketone, acetal, methylene, methyne, olefin, amide, thioester, thioether, imide, imidamide, carbamate, carbamothioic acid, sulfonyl, sulfonamide, silyl oxy, silyl ether, phenoxide, furan, phosphorous acid, quaternary ammonium or hetero cycles or any other group. In one embodiment the linker is ether. In one embodiment the linker is ester. In one embodiment the linker is ketone. In one embodiment the linker is acetal. In one embodiment the linker is methylene. In one embodiment the linker is methyne. In one embodiment the linker is olefin. In one embodiment the linker is amide. In one embodiment the linker is thioester. In one embodiment the linker is thioether. In one embodiment the linker is imide. In one embodiment the linker is imidamide. In one embodiment the linker is sulfonyl. In one embodiment the linker is quaternary ammonium. In one embodiment the linker L' is a ketone. In one embodiment the linker L' is an aldehyde. FIG. 16 discloses a non-limiting list of possible linkers. In FIG. 16 the aryl groups represents lignin and the linker may be derived from an aliphatic hydroxyl group as well. Depending on the linking group and the linking agent the linker may be connected to the lignin chain at different parts such as via hydroxyl groups or the aryl groups. FIG. 19 shows a schematic view of the functionalized lignin according to present invention.

In one embodiment the lignin is modified with alkyl containing groups and where some of the alkyl containing groups are linked to the lignin via an ether linker and some of the alkyl containing groups are linked via an ester linker. The amount of ether linkages may be 10-90%, such as 20% or higher, or 40% or higher, or 60% or higher, or 90% or lower or 70% or lower of the total amount of linkers. In one embodiment the amount of ether linkages is 40-60%. The amount of ester linkages may be 10-90%, such as 20% or higher, or 40% or higher, or 60% or higher, or 90% or lower or 70% or lower of the total amount of linkers. In one embodiment the amount of ether linkages is 40-60%. By functionalizing using different linkers the functionalization will be less dependent on the availability of the functional group and reagents but still obtain a soluble and/or miscible lignin product. Using different linkers may also make the process and the final product cheaper due to that the amount of more expensive reagents may be reduced but still obtain a soluble and/or miscible product for example.

When the lignin is bound to a quaternary ammonium the bond between the lignin and the quaternary ammonium is ionic. The quaternary ammonium may be any quaternary ammonium having the general formula

Figure 17:
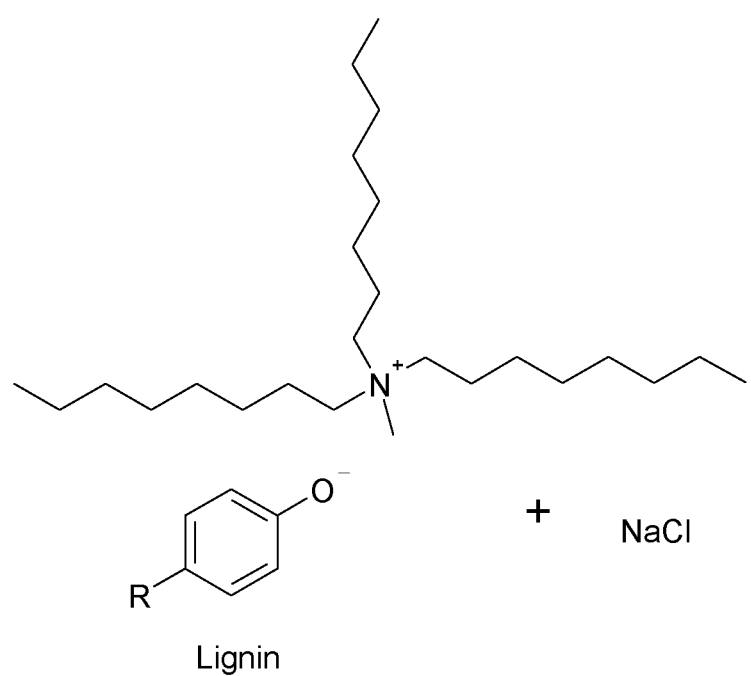

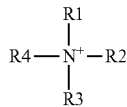

where each R1 to R4 are individually selected from a hydrogen, alkyl, alkoxy alkyl, alkyl alkoxy alkyl or alkyl ester wherein at least one of R1 to R4 is alkyl, alkoxy alkyl, alkyl alkoxy alkyl or alkyl ester. In one embodiment R1 is a methyl group or hydrogen. In another embodiment each R2 to R4 are alkyl groups. In one embodiment each R2 to R4 comprises a C6 or longer alkyl group, or a C12 or longer alkyl group. In one embodiment comprises R3 and R4 a C12 or longer alkyl group. In one embodiment the quaternary ammonium is a [alkyl]$_2$N(CH$_3$)$_2$$^+$ or [alkyl ester]$_2$N(CH$_3$)$_2$$^+$ or [alkyl]$_3$N(CH$_3$)$^+$ or [alkyl ester]$_3$N(CH$_3$)$^+$ where the alkyl is a C7 or longer alkyl. In one embodiment the counter ion to the quaternary ammonium is not chloride. In another embodiment the counter ion is HSO$_4$. In another embodiment the quaternary ammonium is tricaprylylmethyl ammonium chloride, [CH$_3$(CH$_2$)$_{17}$]$_2$N(CH$_3$)$_2$HSO$_4$, (CH$_3$(CH$_2$)$_{18}$)$_{21}$N$^+$(CH$_3$)$_2$)Cl$^-$, [CH$_3$(CH$_2$)$_7$]$_3$NCH$_3$Cl, or [alkyl]$_2$N(CH$_3$)$_2$HSO$_4$ or [alkyl ester]$_2$N(CH$_3$)$_2$HSO$_4$. FIG. 17 discloses a schematic picture of lignin modified with a quaternary ammonium.

The alkyl section of the alkyl containing group of the modified lignin may be a C1 or longer alkyl group, such as or C2 or longer, or a C3 or longer group, or C4 or longer, or C5 or longer, or C6 or longer, or C7 or longer, or C8 or longer, or C9 or longer, or C10 or longer, or C12 or longer, or C14 or longer, or C16 or longer, or C18 or longer. In one embodiment the alkyl containing group is a C14-C18 alkyl group. In one embodiment the alkyl containing group is an alkyl group. In one embodiment the alkyl containing group is derived from fatty acid methyl ester (FAME). The fatty acid methyl ester (FAME) is preferably unsaturated. The FAME may be derived from vegetable oils such as palm, soybean, rapeseed, sunflower, peanut, cottonseed, palm kernel, coconut or olive oil. FAME obtained from natural sources such as plants, vegetables or animals is usually a mixture of fatty acid compounds having different length such as C14-C20. In one embodiment a majority of the fatty acid methyl esters is a C14-C18 unsaturated fatty acid methyl ester. In one embodiment the FAME is methyl cis-9-octadecanoate or the FAME is a mixture comprising methyl cis-9-octadecanoate.

The degree of modification of the hydroxyl groups expressed as number of equivalents to lignin repeating units. The number of equivalents may be 0.2 or higher, or 0.4 or higher, or 0.6 or higher, or 0.8 or higher. In this application the repeating unit of lignin is assumed to have a molecular weight of 180 g/mol. The degree of modification of the lignin when the lignin is modified via an ether linkage may be quite low and still be miscible with the first polymer. In one embodiment the number of equivalents may be 0.05-0.2, such as 0.1-0.15.

An advantage of the modified lignin according to the present invention is its thermal stability. In one embodiment the modified lignin is thermally stable at temperatures of at least 150° C., or at least 180° C., or at least 200° C., or at least 220° C., or at least 240° C.

The modified lignin according to the present invention may have a weight average molecular weight ($M_w$) of 1,000 g/mol or higher, or 1,200 g/mol or higher, or 1,500 g/mol or higher, or 1,800 g/mol or higher, or 2,000 g/mol or higher, or 2,500 g/mol or higher, or 3,500 g/mol or higher but less than 10,000 g/mol, or less than 6,000 g/mol. In one embodiment the number average molecular weight ($M_n$) is 1,500 to 4,000 g/mol, or 2,200 g/mol to 3,700 g/mol.

Molecular weight in the present application is determined using GPC (Gel Permeation Chromatography) operated at 20° C. and at flow rate of 1 ml/min using THF as solvent. Polystyrene Standard RedayCal Set M(p) 250-70000 (16 standards) (Sigma product no: 76552). The colons are Styragel THF (pre-colon), Styragel HR 3 THF (7.8×300 mm), Styragel HR 1 THF (7.8×300 mm), Styragel HR 0.5 THF (7.8×300 mm) all from Waters.

Preparation of the Lignin

The present inventors found that by alkylating the hydroxyl groups or other parts of the lignin the miscibility of the lignin in other polymers increased drastically. The preparation of the modified lignin has been described in detail in PCT/SE2016/050584, WO2015094099 and WO2016072915 which are hereby incorporated by reference.

The material according to the present invention may be prepared by first preparing the lignin that is modified or derivatized with an alkyl containing group via a linker followed by mixing said modified lignin with the first polymer. The modification may be done in a suitable solvent. The modified lignin may be isolated from the modification reaction mixture or the modified lignin may be left in the reaction mixture when mixed with the first polymer. The mixing can be done by stirring or shaking or in any other suitable way and the slurry is then heated. Any catalyst and any other unwanted components may be removed afterwards using any suitable technique.

The modification may be performed at 50° C. and 350° C., such as 50° C. or higher, or 80° C. or higher or 100° C. or higher, or 120° C. or higher, or 150° C. or higher, but not higher than 350° C., or 250° C. or lower, or 200° C. or lower, or 180° C. or lower.

When the linker is an ester group the modification agent may be a carboxylic acid or an anhydride. The esterification of the lignin may be performed in a suitable solvent leaving a homogenous composition of solvent and esterified lignin, and optionally catalyst. When the esterification is performed in a fatty acid and together with an esterification agent such as an anhydride the obtained esterified lignin is believed to comprise ester groups derived from the anhydride alone but also ester groups derived from an anhydride bond to a first fatty acid. In order to remove any acid groups of remaining fatty acids any suitable method may be used. For example an alcohol such as methanol may be added.

The esterified lignin may be isolated by precipitation in for example hexane or water. When the degree of substitution (esterification) is high, for example 50% or more, and the lignin is substituted with C2-C4 ester groups the esterified lignin may be treated with a base for example NaHCO$_3$ (aq.) before precipitation in order to remove free acid. When the lignin is substituted with longer ester groups celite may be used. The esterified lignin according to the present invention may also be separated from metals and other additives or catalysts by simply rinsing the lignin in an aqueous solution or water. For many industries the amount of metals should be as low as possible since metals may damage the machinery or disturb the process.

The esterification agent may be a carboxylic acid or an anhydride. The esterification agents preferably contain an unsaturated bond. Non-limiting examples of carboxylic acids are fatty acids or C2-C42 carboxylic esters, preferably C4 to C22 such as C18, and non-limiting examples of anhydrides are C4 to C42 anhydrides. The ester groups may therefore be C2-C42 or C4-C42 preferably C4-C22 such as C18. Another important factor is the availability and the cost of the esterification agent. The catalyst for the esterification may be a nitrogen containing aromatic heterocycle such as N-methyl imidazole or pyridine, or the catalyst may be a metal acetylacetonate such as TiO(acac)$_2$ or Fe(acac)$_3$. In one embodiment the catalyst is DMAP (4-dimethylaminopryidine). Esterification may also be done by transesterification.

When the linker is an ether group the modification agent may be an epoxide. In one embodiment the epoxide is an alkyl epoxide for example a C5 or longer alkyl epoxide, or a C12 or longer alkyl epoxide, or C18 or longer alkyl epoxide. In one embodiment the epoxide is a fatty acid epoxide such as fatty acid methyl ester (FAME). The fatty acid methyl ester (FAME) is preferably unsaturated. In one embodiment the fatty acid methyl ester is a C14-C20 unsaturated fatty acid methyl ester. In one embodiment the FAME epoxide is methyl cis-9-octadecanoate epoxide or the FAME epoxide is a mixture comprising methyl cis-9-octadecanoate epoxide. FIG. 19b shows a schematic view over a modified lignin where the modification has been done for example via an epoxy group on for example a fatty acid. This epoxy group is formed via the unsaturated bond found in for example FAME using well known chemistry. The etherification may be performed at 80° C. or higher, or 120° C. or higher, or 150° C. or higher, or 180° C. or higher, preferably at 350° C. or lower, or at 250° C. or lower, or at 200° C. or lower. The etherification of the lignin may be done in a suitable solvent forming a homogenous composition of solvent and ether functionalized lignin, and optionally catalyst. The catalyst and any other unwanted components may be removed afterwards.

The etherification may be done by first mixing the lignin with an amine forming a first mixture and then heating the first mixture. To the first mixture an epoxide is then added and a second mixture is obtained which is then heated. The formed ether functionalized lignin is then mixed with the first polymer in order to form the material according to the present invention. The amine may be an alkyl amine for example a C5 or longer alkyl amine, or a C12 or longer alkyl amine. In one embodiment the amine is dodecylamine. The temperature at which the first and the second mixtures are heated may be 100° C. or higher, or 150° C. or higher, or 180° C. or higher. The mixture may be pressurized or refluxed. The amine may be added in a 2:1 to 0.5:1 weight ratio to the lignin, such as 1.10:1 to 0.90:1 or close to 1:1. The epoxide may be added in a 2:1 to 0.5:1 weight ratio to the first mixture, such as 1.10:1 to 0.90:1 or close to 1:1.

The etherification may also be done by mixing lignin with a primary or a secondary epoxide forming a first mixture and then heating the first mixture. To the first mixture may an anhydride be added forming a second mixture which is then heated. The primary or secondary epoxide may be an alkyl epoxide for example a C5 or longer alkyl epoxide, or a C12 or longer alkyl epoxide, or C18 or longer alkyl epoxide. In one embodiment the alkyl epoxide is a C5-C18, or a C6-C14, or a C8-C12. In one embodiment the epoxide is a fatty acid epoxide. The anhydride may be a C4-C10 anhydride. The temperature at which the first and the second mixtures are heated may be 100° C. or higher, or 150° C. or higher, or 180° C. or higher. The mixture may be pressurized or refluxed. The epoxide may be added in a 2:1 to 0.5:1 weight ratio to the first mixture, such as 1.10:1 to 0.90:1 or close to 1:1. The anhydride may be added in a 2:1 to 0.5:1 weight ratio to the lignin. The etherified lignin may be further purified by recrystallization.

When the lignin is functionalized via both ester and ether linkers the etherification is preferably done before the esterification.

When the linker is a quaternary ammonium the modified lignin may be prepared by mixing the lignin and the quaternary ammonium salt during heating, optionally together with a solvent, followed by adding the oil and mixing. The obtained mixture may be washed using water or acid. By using quaternary ammonium as a linker lignosulfonate may be brought into solution in various solvents.

The hydroxyl groups of lignin may be divided into aliphatic hydroxyls (ROH), condensed phenol (PhOH), phenol and acids. The degree of substitution, i.e. the degree of hydroxyl groups that has been converted into ester groups, may be from 10% to 100%, for example 20% or more, 30% or more, or 40% or more, or 60% or more or 80% or more, or 99% or more, or 100%. When the solvent comprises an organic solvent the degree of substitution does not have to be as high, for example 10-60% or 20-40%.

One advantage of the present invention is that a higher amount of lignin may be dissolved in a solvent and in many different solvents and thereby facilitating blending or mixing the lignin with various polymers. The amount of lignin in the composition or mixture may be 1 weight % or more, or 2 weight % or more, or 4 weight % or more, or 5 weight % or more, or 7 weight % or more, or 10 weight % or more, or 12 weight % or more, or 15 weight % or more, or 20 weight % or more, or 25 weight % or more, or 30 weight % or more, or 40 weight % or more, or 50 weight % or more, or 60 weight % or more, or 70 weight % or more, or 75 weight % or more. In one embodiment the lignin content is 10-40 weight % such as 15-35 weight %.

In one embodiment the lignin is dearomatized. For example the lignin is dearomatized to at least 40%, or at least 50%, or at least 60%, or at least 70%, or at least 80%, or at least 90%, or at least 95%, or at least 99%.

The Material

The present invention relates to a material comprising a first polymer and a second polymer wherein the first polymer is a natural or a synthetic polymer and the second polymer is modified lignin. The modification of the modified lignin is done by alkylation of the lignin via a linker wherein the linker is selected from an ether, ester, ketone, acetal, methylene, methyne, olefin, amide, thioester, thioether, imide, imidamide, carbamate, carbamothioic acid, sulfonyl, sulfonamide, silyl oxy, silyl ether, phenoxide, furan, phosphorous acid, quaternary ammonium or hetero cycles In one embodiment the material comprises a first polymer and a second polymer wherein the first polymer is a natural or a synthetic polymer and the second polymer is modified lignin; wherein the modified lignin is modified with an alkyl containing group via linker wherein the linker is an ether group and wherein the alkyl containing group is derived from fatty acid methyl ester.

It was unexpected that the polymeric material according to the present invention could be processed so well. Additionally no compatibilizer was needed which makes the material less expensive and more environmentally friendly. The amount of any additional compatibilizer may be 7 wt % or less, or 5 wt % or less, or 3 wt % or less, or 2 wt % or less, or 1 wt % or less, or 0.5 wt % or less. In one embodiment the material is essentially free from any additional compatibilizer.

The first polymer may be any suitable natural or synthetic polymer. In one embodiment the polymer is a polyolefin such as polyethylene or polypropylene. In another embodiment the first polymer is a polyester such as polyethylene terephthalate. In another embodiment the first polymer is a polynitrile such as polyacrylonitrile (PAN). In another embodiment the first polymer is a polycarbonate.

The amount of first polymer in the material may bel-99 wt %, such as 3 wt % or more, or 5 wt % or more, or 10 wt % or more, or 15 wt % or more, or 20 wt % or more, or 25 wt % or more, or 30 wt or more, or 35 wt % or more, or 40 wt % or more, or 45 wt % or more, or 50 wt % or more, or 90 wt % or less, or 85 wt % or less, or 80 wt % or less, or 75 wt % or less, or 70 wt % or less, or 65 wt % or less, or 60 wt % or less.

The amount of modified lignin in the material may be 1-99 wt %, such as 3 wt % or more, or 5 wt % or more, or 10 wt % or more, or 15 wt % or more, or 20 wt % or more, or 25 wt % or more, or 30 wt % or more, or 35 wt % or more, or 40 wt % or more, or 45 wt % or more, or 50 wt % or more, or 90 wt % or less, or 85 wt % or less, or 80 wt % or less, or 75 wt % or less, or 70 wt % or less, or 65 wt % or less, or 60 wt % or less.

In one embodiment the material comprises a polyolefin such as polypropylene and modified lignin; wherein the modified lignin is either modified with an alkyl containing group via a linker wherein the linker is an ether group and wherein the alkyl containing group is derived from fatty acid methyl ester, or wherein the modified lignin is modified with a fatty acid via an ester group; and wherein the amount of polyolefin is 70-90 wt % such as 75-85 wt % and wherein the amount of modified lignin is 10-30 wt % such as 15-25 wt %.

In another embodiment the material comprises a polyester such as polyethylene terephtalate and modified lignin; wherein the modified lignin is either modified with an alkyl containing group via a linker wherein the linker is an ether group and wherein the alkyl containing group is derived from fatty acid methyl ester, or wherein the modified lignin is modified with a fatty acid via an ester group; and wherein the amount of polyester is 70-95 wt % such as 80-90 wt % and wherein the amount of modified lignin is 5-30 wt % such as 10-20 wt %.

In yet another embodiment the material comprises a polynitrile such as polyacrylonitrile (PAN) and modified lignin; wherein the modified lignin is either modified with an alkyl containing group via a linker wherein the linker is an ether group and wherein the alkyl containing group is derived from fatty acid methyl ester, or wherein the modified lignin is modified with a fatty acid via an ester group; and wherein the amount of polynitrile is 40-60 wt % such as 45-55 wt % or 50 wt % and wherein the amount of modified lignin is 40-60 wt % such as 45-55 wt % or 50 wt %.

The obtained material of the modified lignin and the polyolefin, such as polypropylene, or the polyester showed very good mechanical properties.

A study showed that the material could be processed through extrusion and injection moulding without any problem, even without any added compatibilizer. The modified lignin could be compounded together with the first polymer followed by extrusion at sufficiently high temperatures such as at 180-250° C. The extrusion can be done using a twin screw extruder. The obtained extruded product may be turned into pellets or powder which may then be dried using any suitable technique.

Injection moulding of the present material may also be done at temperatures above 180° C. or even at 200° C. or higher without any increase in viscosity or pressure. In one embodiment the temperature is 180-250° C. The starting material for the injection moulding may be the pellets or powder obtained from the extrusion described above. Injection moulding facilitates that the more complex shapes and structures may be prepared from the present material.

An additional advantage of the present material is that it has a pleasant smell.

Applications

The present modified lignin may be used as a compatibilizer. The modified lignin may be mixed with polymers or mixtures of polymers in solution, dry state or in melt. The polymers may be a polyolefin, polyester or a polynitrile. The amount of modified lignin may be 0.1-10 wt %, such as 0.5-5 wt %.

EXAMPLES

1. Renol Preparation 1.1 An Example of how to Prepare Renol of Esterified Lignin—Stearic Acid Esters.

Full substitution: According to the general procedure of esterification, following amounts were used: Lignin type A2 (1.00 g, 1 eq.), stearic anhydride (6.12 g, 2 eq.), 1-methylimidazole (0.1 ml) and dioxane (15 ml). For purification, celite (50 g) was used with 0.5 M solution of $NaHCO_3$ (400 ml). Some tetrahydrofuran was added to wet the celite. The ester was washed off with neat hexane to give 1.97 g of stearic acid ester as a brown solid.

Partial substitutions: According to the general procedure of esterification, following amounts were used: Lignin type A2 (1.00 g, 1 eq.), stearic anhydride (0.31 or 0.92 g, 0.1 or 0.3 eq.), 1-methylimidazole (0.1 ml) and dioxane (10 ml). After the reaction the esters were purified according to the general purification of partially substituted esters. 0.1 and 0.3-eq. reactions afforded 1.12 g and 1.01 g respectively of the corresponding esters as brown powders.

1.2 An Example of how to Prepare Renol of Etherified Lignin

The general procedure is adding Kraft lignin 0.25 g, epoxide 0.25 g to a 25 ml microwave vial capping the vial and flush with nitrogen for 10 min stir the solution mixture at 150° C. under nitrogen for 14 h dissolve with toluene 20 ml and then centrifuge dissolve toluene-insoluble material with chloroform and then filter.

To acid precipitated lignin from black liquor was a primary epoxide (C18) added in a 1:3.8 weight % proportion (lignin:epoxide) forming a mixture and heated at 150 or 200° C., respectively, for 5 hours.

The obtained etherified lignin may be further purified by recrystallization.

1.3 Preparation of Modified Lignin, Ether

FAME-epoxide (methyl cis-9-octadecanoate, 600.0 g) was added to pre-dried (at 60° C. over night) Kraft lignin (600.0 g). The suspension was stirred mechanically and heated in an oil bath at 50° C. and the reaction flask was evacuated to 20 mbar. The temperature of oil bath was increased to 190° C. over 2 hours. After 45 min at 190° C. more FAME-epoxide (130.0 g) was added and heating at reduced pressure was continued for 1 hour. The product was poured out while hot on a stainless-steel plate and cooled to room temperature to give 1232.8 g of a dark brown brittle material.

The product was crushed to smaller pieces and dissolved overnight in ethyl acetate (1.5 L) on a shaker after which pentane (5.0 L) was added in a steady stream while vigorously stirring the solution. The obtained suspension was filtered and the obtained cake was washed in portions with pentane (totally 3.0 L). After drying at room temperature in air 692.0 g of product was obtained as a light brown powder.

1.4 Preparation of Modified Lignin, Ether

FAME-epoxide (methyl cis-9-octadecanoate, 250.0 g) was added to pre-dried (at 60° C. over night) Kraft lignin (162.5 g). The suspension was stirred mechanically and heated in an oil bath at 50° C. and the reaction flask was evacuated to 20 mbar. The temperature of oil bath was increased to 190° C. over 2 hours. After 45 min at 190° C. more FAME-epoxide (130.0 g) was added and heating at reduced pressure was continued for 1 hour. The product was poured out while hot on a stainless-steel plate and cooled to room temperature to give 1232.8 g of a dark brown brittle material.

The product was washed with water four times during heating and stirring and then dried.

2. Characterization 2.1 Materials

Four different grades of Renol® (modified lignin) were received from RenFuel AB. The general characteristics of Renol® are presented in Table 1.

2.2 Methods 2.2.1 Thermogravimetric Analysis (TGA)

Thermogravimetric analysis (TGA) on Renol samples was carried out using Q500 from TA instruments. In this method, change in the mass of the materials is measured as a function of the temperature or time while the test specimen is subjected to a controlled temperature program in air or nitrogen atmosphere. Thermograms obtained from TGA analysis provides the information related to the thermal stability of material. About 20 mg of the sample is subjected for TGA analysis. TGA analysis was performed on the samples between room temperature and 550° C. with heating rate of 10° C./min in both air and nitrogen atmospheres.

2.2.2 Differential Scanning Calorimetry (DSC)

Differential Scanning calorimetry (DSC) on the Renol samples was performed using Netzsch 204-F1 instrument. DSC technique is used to determine glass transition temperature, melting and crystallization behaviour of material subjected to heat under controlled temperature program and atmosphere. About 3-4 mg of the powdered sample was subjected for DSC analysis. The analysis involved 3 cycles of heating and cooling cycles in the following order, 1. Heating the sample from room temperature to 150° C., 2. Cooling from 150° C. to −10° C. and 3. Heating the sample from −10° C. to 150° C. with heating and cooling rate of 10° C./min.

TABLE 1

General characteristics of Renol received from RenFuel AB

| Property/Renol grade | 20% lignin | 40% lignin | 100% derivatised lignin | 100% derivatised lignin |
|---|---|---|---|---|
| Derivatisation | Oleic acid | Oleic acid | Stearic acid | fatty acid w/ etherification |
| Code | RFL20L | RFL40S | RFL100SA & RFL100SB | RFL100SE-II |
| Physical state | Liquid | Semi-solid/ highly viscous | Solid, powder | Solid, powder |
| Composition | 20:80 [Lignin:Oleic acid] | 40:80[Lignin:Oleic acid] | Stearic acid ester of lignin | Etherified lignin |
| Solvent | Oleic acid | Oleic acid | None | None |
| Functional groups | Aliphatic and aromatic hydroxyls, carboxylic acid, ester, double bonds, etc. | Aliphatic and aromatic hydroxyls, carboxylic acid, ester, double bonds, etc. | Esters | Ether Aliphatic hydroxyls (from ring opening of epoxide) |
| Other volatiles | Acetic acid and catalyst | Acetic acid and catalyst | None | None |

2.3 Results and Discussion 2.3.1 TGA of Ester Modified Renols

Figure 1:
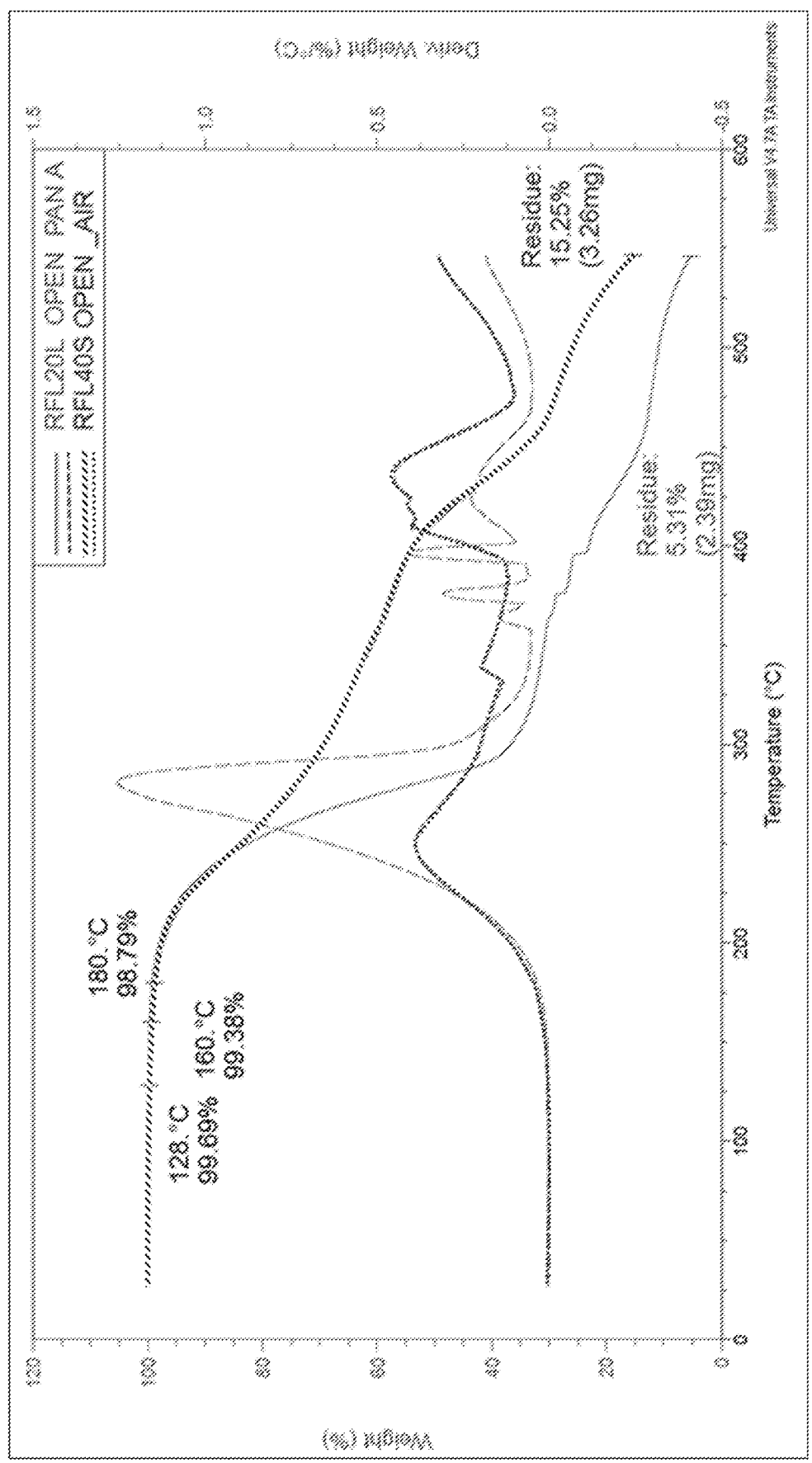
FIG. 1—TGA weight loss and derivative weight loss curves of RFL20L and RFL40S analysed in air atmosphere FIG. 2—TGA weight loss and derivative weight loss curves of RFL40S analysed in $N_2$ and air atmosphere FIG. 3—TGA weight loss and derivative weight loss curves of RFL100SA and RFL100SB analysed in $N_2$ atmosphere FIG. 4—TGA weight loss and derivative weight loss curves of RFL100SE analysed in $N_2$ atmosphere FIG. 5—TGA weight loss and derivative weight loss curves of RFL100SE in comparison to RFL100SA and RFL100SB analysed in $N_2$ atmosphere FIG. 6—Isothermal TGA weight loss curves of RFL40S, RFL100SE and RFL100SB at 180° C. analysed in $N_2$ atmosphere FIG. 7—Isothermal TGA weight loss curves of RFL100SE and RFL100SB at 220° C. analysed in $N_2$ atmosphere FIG. 8—Isothermal TGA weight loss curves of RFL100SE and RFL100SB at 180° C. and 220° C. analysed in $N_2$ atmosphere FIG. 9—DSC curves of RFL40S FIG. 10—DSC heating and cooling curves of RFL100SB FIG. 11—DSC heating and cooling curves of RFL100SE FIG. 12—Tensile strength of reference PP and PP-Renol compounds FIG. 13—Tensile modulus of reference PP and PP-Renol compounds FIG. 14—Elongation at yield of reference PP and PP-Renol compounds FIG. 15—Impact strength of reference PP and PP-Renol compounds FIG. 16—Schematic view of possible linker groups FIG. 17—Schematic view of lignin modified with a quaternary ammonium FIG. 18—Schematic view of lignin FIG. 19—shows a schematic view of the functionalized lignin according to present invention.

TGA weight loss and derivative weight loss curves of RFL20L and RFL40S are presented in FIG. 1. The analysis was performed under air atmosphere. It is clear from the thermograms that the samples are undergoing two step thermal degradation. First step of thermal degradation occurs between 180-350° C. and the second one at above the 350° C. The first thermal degradation could be mainly due to oleic acid fraction and the second degradation is due to lignin fraction. Lignin is a complex macromolecule and is known to undergo thermal degradation in wide temperature range.

The size of the peak responsible for oleic acid fraction degradation in the derivative curve for RFL20L is larger than the RFL40L indicating higher fraction of oleic acid in RFL20L compared to RFL40S. Further, the size of the peak responsible for lignin in derivative curve for RFL40S is higher than the RFL20L indicating more lignin fraction in RFL40S compared to RFL40S.

The residual mass obtained at end of the thermal analysis (@550° C.) for RFL20L and RFL40S respectively are 5.3% and 15.3% respectively. This means that RFL40S has about 10% higher residue after thermal analysis indication higher lignin content which generally produces char on thermal degradation. Some typical TGA characteristics such as temperature at 5% weight loss, onset of thermal degradation, residual mass, etc. are presented in Table 2.

Figure 2:
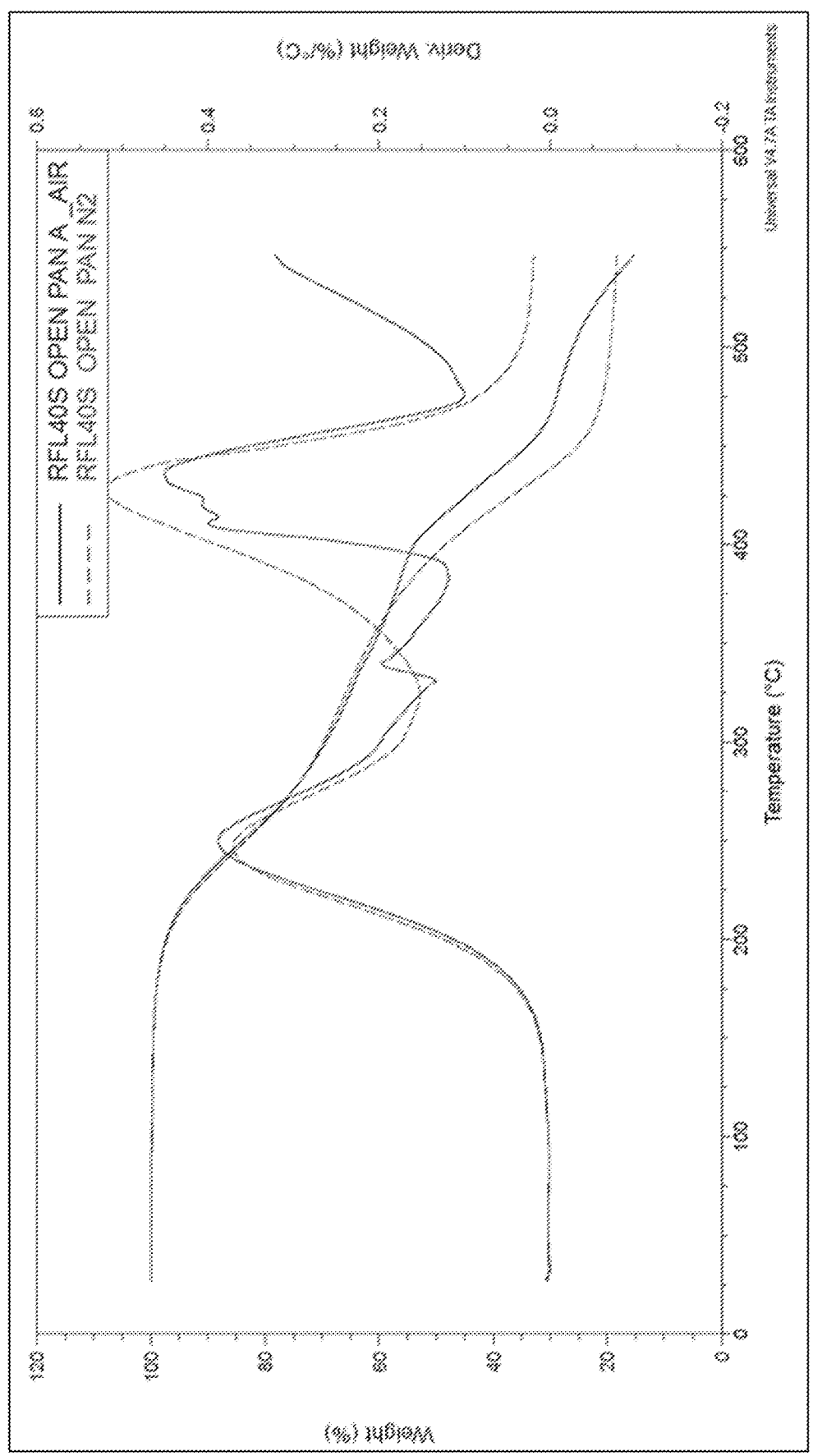

TGA weight loss and derivative weight loss curves of RFL40S subjected for thermal analysis in presence of air and $N_2$ atmosphere are presented in FIG. 2 (TGA weight loss and derivative weight loss curves of RFL40S). It can be noticed from the thermograms that the sample undergoes almost similar decomposition both in air and $N_2$ atmospheres until 480° C. However, after 480° C., the sample analysed in $N_2$ atmosphere showed no considerable weight loss whereas the sample analysed in air atmosphere showed gradual weight loss indicating further oxidative decomposition.

TABLE 2

TGA characteristics of RFL20L and RFL40S materials (oleic acid derivatised Renols)

| Sample/ Characteristics | Unit | RLF20L | | RFL40S | |
|---|---|---|---|---|---|
| | | Air | $N_2$ | Air | $N_2$ |
| Temp at 5% weight loss | ° C. | 218 | Not analysed | 218 | 213 |
| Start of decomposition | ° C. | 150 | Not analysed | 150 | 120 |
| Onset of $1^{st}$ decomposition | ° C. | 243 | Not analysed | 212 | 207 |
| Delta weight of $1^{st}$ component | wt-% | 70 | Not analysed | 37 | 34 |
| Onset of $2^{nd}$ decomposition | ° C. | 394 | Not analysed | 400 | 387 |
| Residual @550° C. | wt-% | 5 | Not analysed | 17 | 18 |

Figure 3:
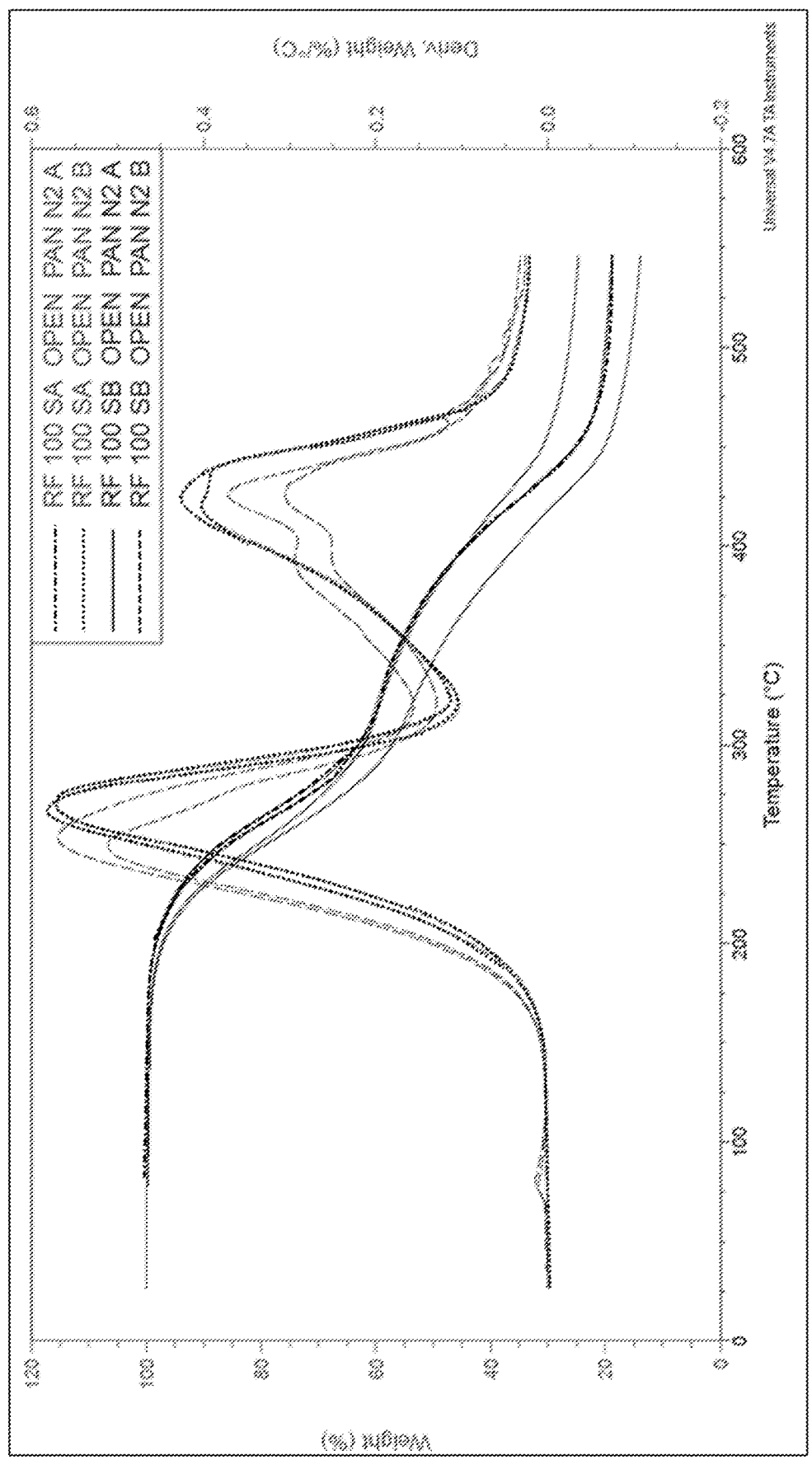

The TGA weight loss and derivative weight loss curves of RFL100SA and RFL100SB are presented in FIG. 3. The analysis was performed in duplicate under $N_2$ atmosphere. It is clear from the thermograms that the two samples presented slightly different weight loss behaviour. Similar to RFL40S, both the samples presented two step degradation behaviour, one due to fatty acid fraction degradation between 180-350° C. and other one due to lignin degradation above 350° C. Among two samples, RFL100SA presented slightly higher thermal stability and thermograms of two parallels were very similar. On the other hand, RFL100SB observed to be slightly less thermal stable. In addition, the samples presented small weight loss at around 75 C due to loss of small volatile fraction. Further, the parallel samples presented slightly different weight loss curve for first degradation step indicating presence of fatty acid fraction slightly different among the samples. These results indicate the sample RFL100SB is slightly inhomogeneous with respect to fatty acid content. TGA characteristics of the samples is presented in Table 3.

2.3.2 TGA of Ether Modified Renols

The TGA weight loss and derivative weight loss curves of two parallel samples of RFL100SE-11 are presented in FIGS. 4 to 7.

Figure 4:
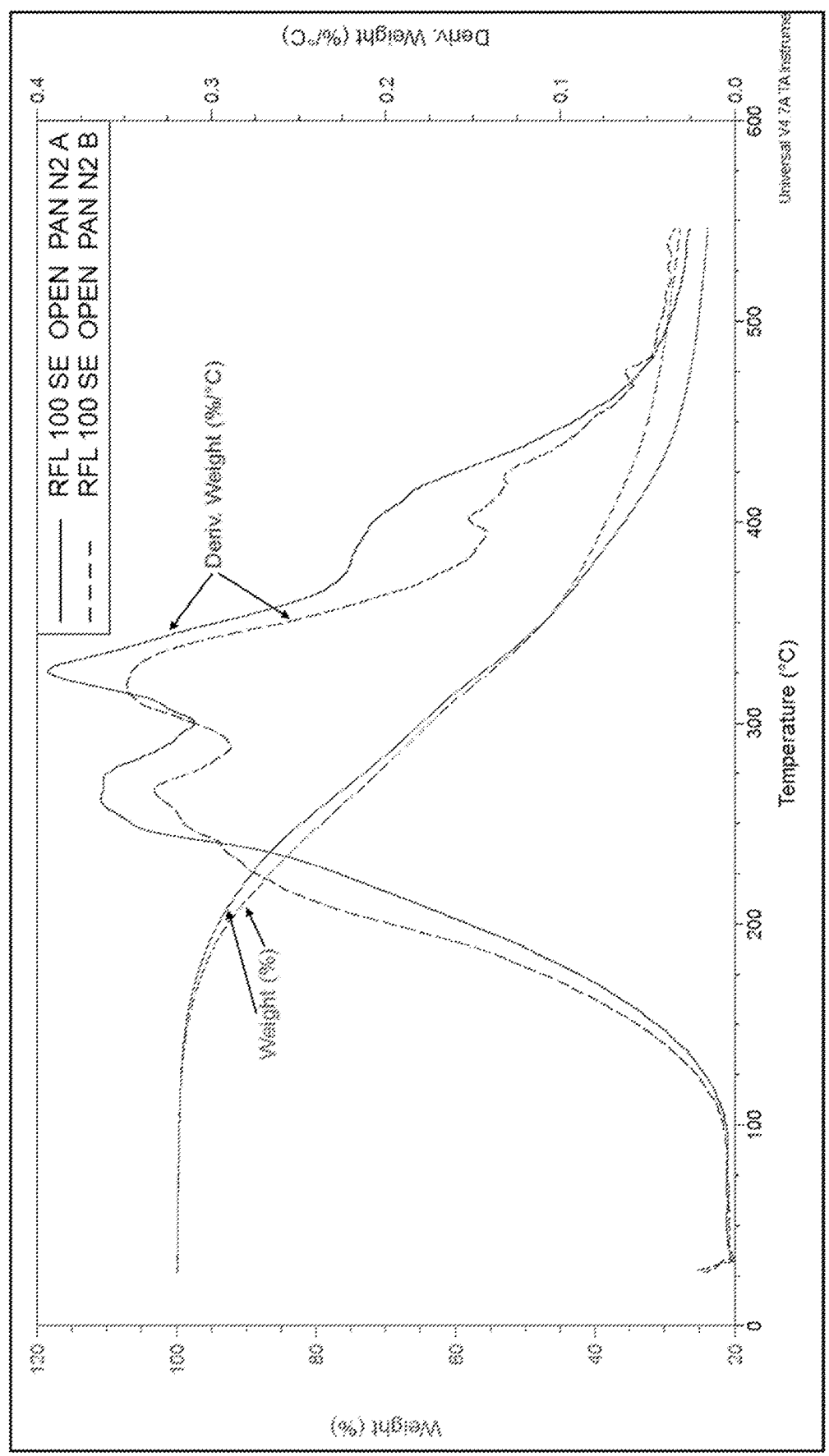

FIG. 4. The sample presented a weight loss in wide temperature range, 100-480° C. Above 480° C., the weight loss was not significant. Unlike other samples (ester modified lignins), RFL100SE presented weight loss in 3 steps. The first step of decomposition occurs between the temperature 100-300° C., the second decomposition occurs between 300-375° C. and last decomposition occurs between 375-475° C. First two decomposition steps could be due to ether components and last one could be due to the gradual decomposition due to part of lignin. Further, the amount of residue left on thermal decomposition of parallel samples is slightly different indication slight inhomogeneity in the samples. This could be obvious due to complex nature of lignin. TGA characteristics of the samples is presented in Table 3.

TABLE 3

TGA characteristics of RFL100SA, RFL100SB and RFL100SE-II materials

| Sample/ Characteristics | Unit | RFL100SA $N_2$ | RFL100SB $N_2$ | RFL100SE-II $N_2$ |
|---|---|---|---|---|
| Temp at 5% weight loss | °C. | 222 | 213 | 193 |
| Start of decomposition | °C. | 135 | 146 | 100 |
| Onset of $1^{st}$ decomposition | °C. | 226 | 215 | 205 |
| Delta weight of $1^{st}$ component | wt-% | 40 | 40/45 | 34 |
| Onset of $2^{nd}$ decomposition | °C. | 379 | 359/416 | 314/376 |
| Residual @550° C. | wt-% | 19 | 14/25 | 24/28 |

Figure 5:
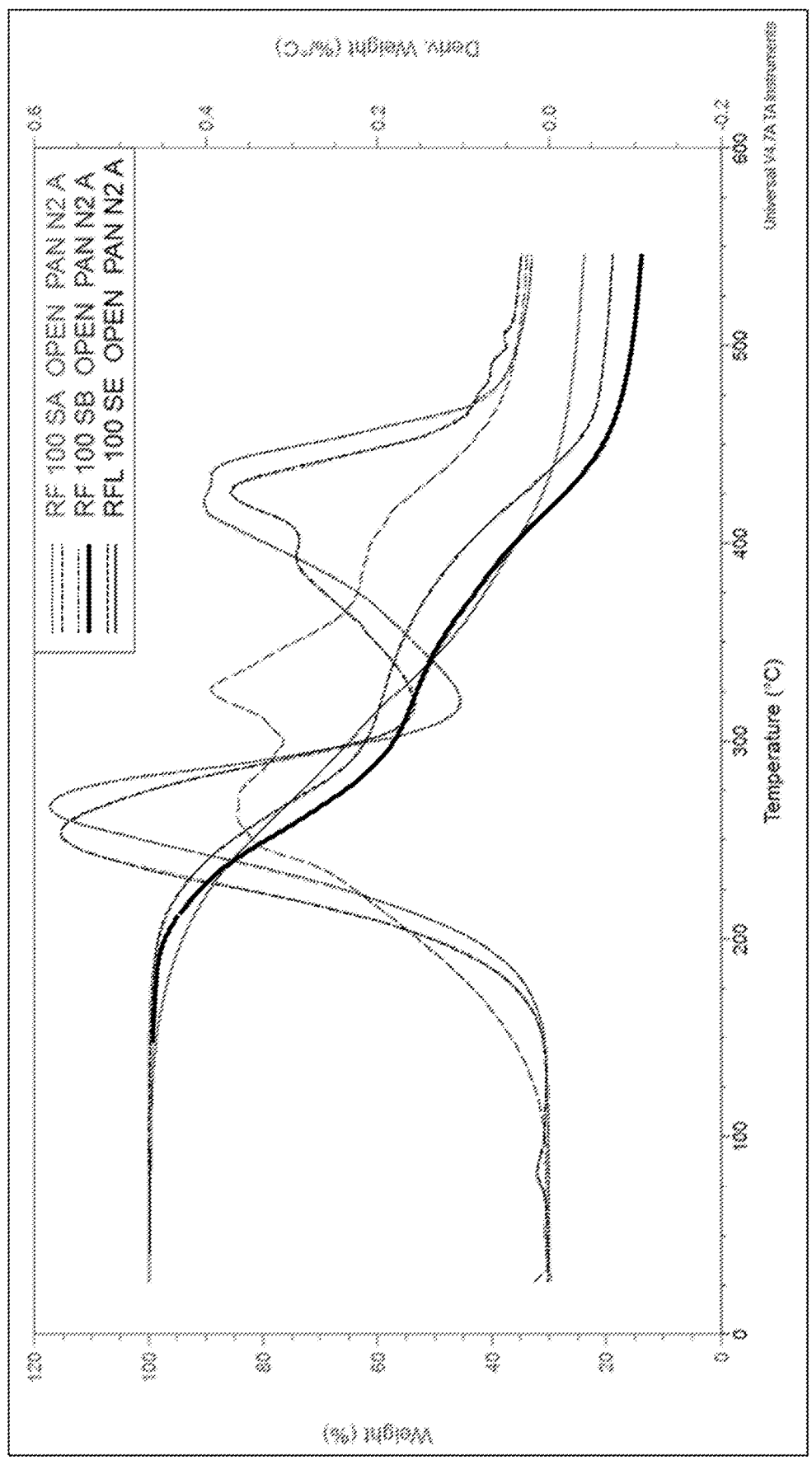
Figure 6:
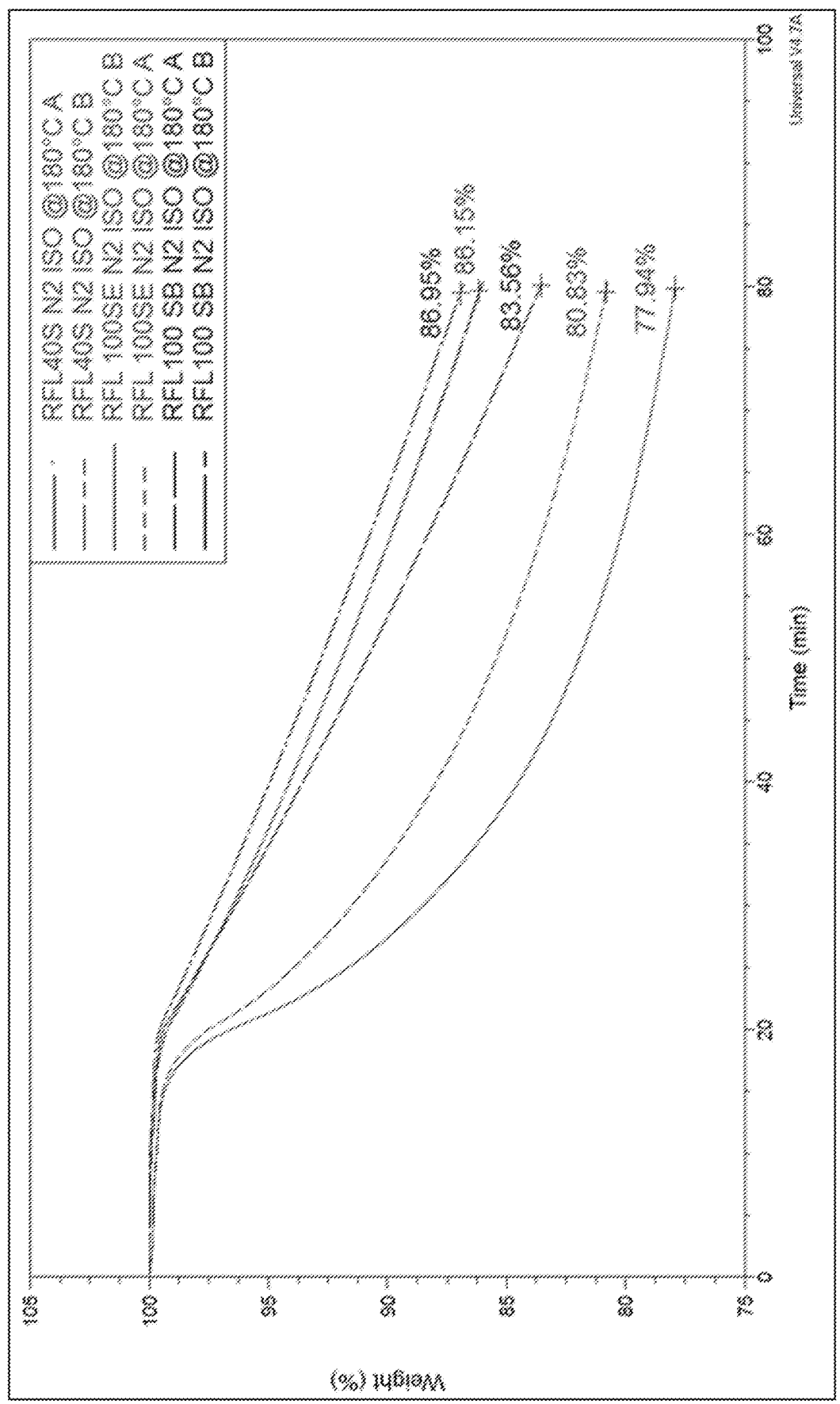
Figure 7:
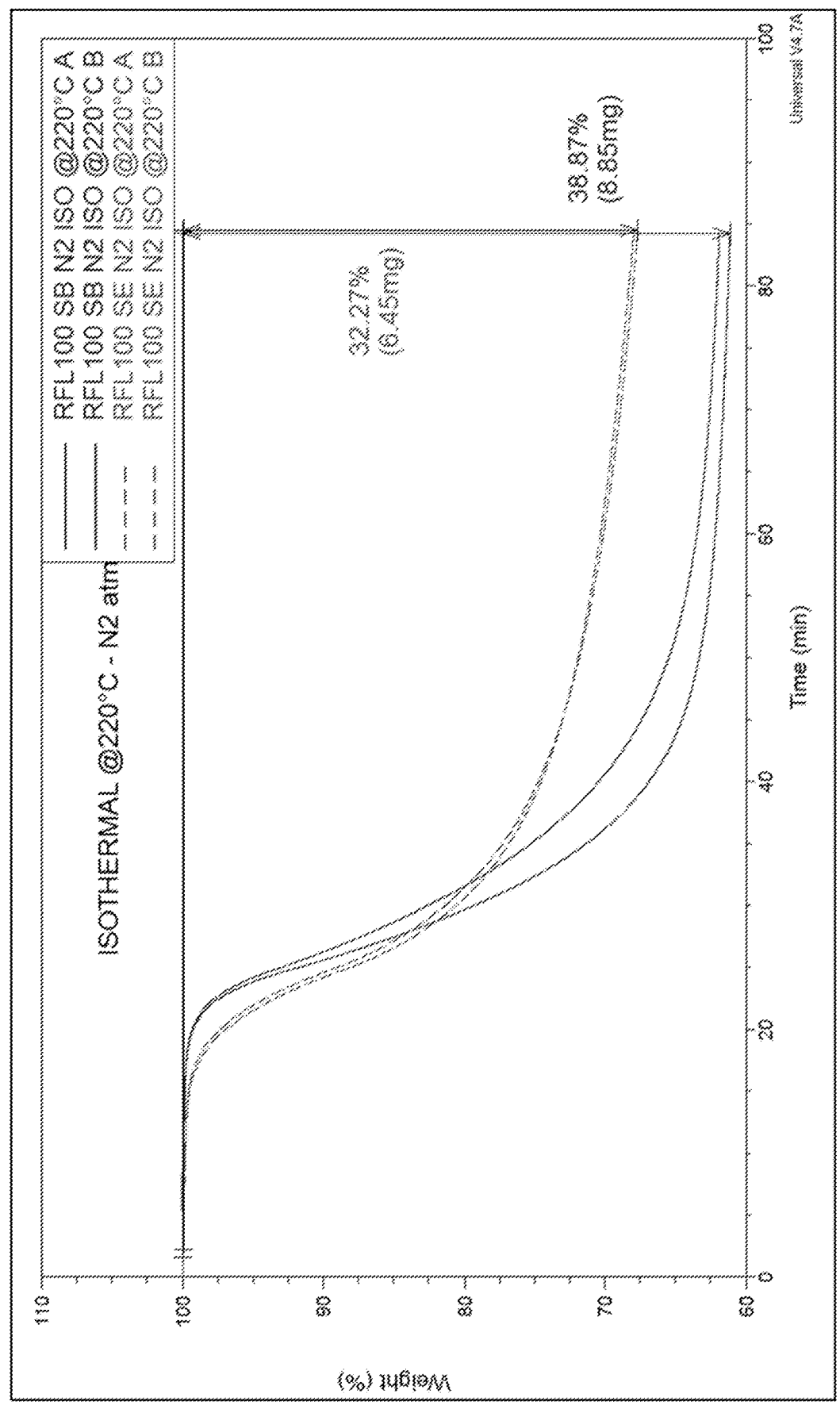

The TGA weight loss and derivative weight loss curves of RFL100SE in comparison to RFL100SA and RFL100SB are presented in FIG. 5. Different thermal degradation behaviour of ether modified lignin is clearly seen in FIG. 5 in comparison to ester modified lignin indicating ether modified lignin is different in composition compared to ester modified lignin.

2.3.3 Isothermal TGA

In order to understand the thermal stability of Renol samples better and in particular at processing temperatures of commodity polymers, isothermal TGA was also performed. Isothermal thermograms of parallel samples of RFL40S, RFL100SB and RFL100SE, analysed at 180° C. are presented in FIG. 6. On the other hand, RFL40S and RFL100SB presented similar isothermal weight loss curves. In case of RFL100SB, two parallels showed slightly different isothermal weight loss curves similar to FIG. 3 indicating inhomogeneity. However, isothermal weight loss curves for RFL40S were quite same. When the isothermal weight loss curves are observed very closely, it takes about 5-8 minutes for 5% weight loss for RFL100SE. Whereas for RFL40S and RFL100SB, it takes about 20-25 minutes for same 5% weight loss under isothermal TGA at 180° C.

Isothermal TGA analysis was also performed at 220° C. on both RFL100SB and RFL100SE samples. The resulting isothermal weight loss curves of the samples is presented in the FIGS. 7 and 8. FIG. 1—TGA weight loss and derivative weight loss curves of RFL20L and RFL40S analysed in air atmosphere FIG. 2—TGA weight loss and derivative weight loss curves of RFL40S analysed in N2 and air atmosphere FIG. 3—TGA weight loss and derivative weight loss curves of RFL100SA and RFL100SB analysed in N2 atmosphere FIG. 4—TGA weight loss and derivative weight loss curves of RFL100SE analysed in N2 atmosphere FIG. 5—TGA weight loss and derivative weight loss curves of RFL100SE in comparison to RFL100SA and RFL100SB analysed in N2 atmosphere FIG. 6—Isothermal TGA weight loss curves of RFL40S, RFL100SE and RFL100SB at 180° C. analysed in N2 atmosphere FIG. 7 The isothermal weight loss behaviour of the samples was quite different at 220° C. compared to 180° C. Though the sample RFL100SE showed slightly higher initial weight loss, it was not very significant after 20 minutes of isothermal TGA at 220° C. whereas RFL100SB showed continuous weight loss until 30 minutes of isothermal TGA at 220° C. At end of 60 minutes of isothermal TGA at 220° C., the total weight loss in case of RFL100SE is lower than the RFL100SB.

Figure 8:
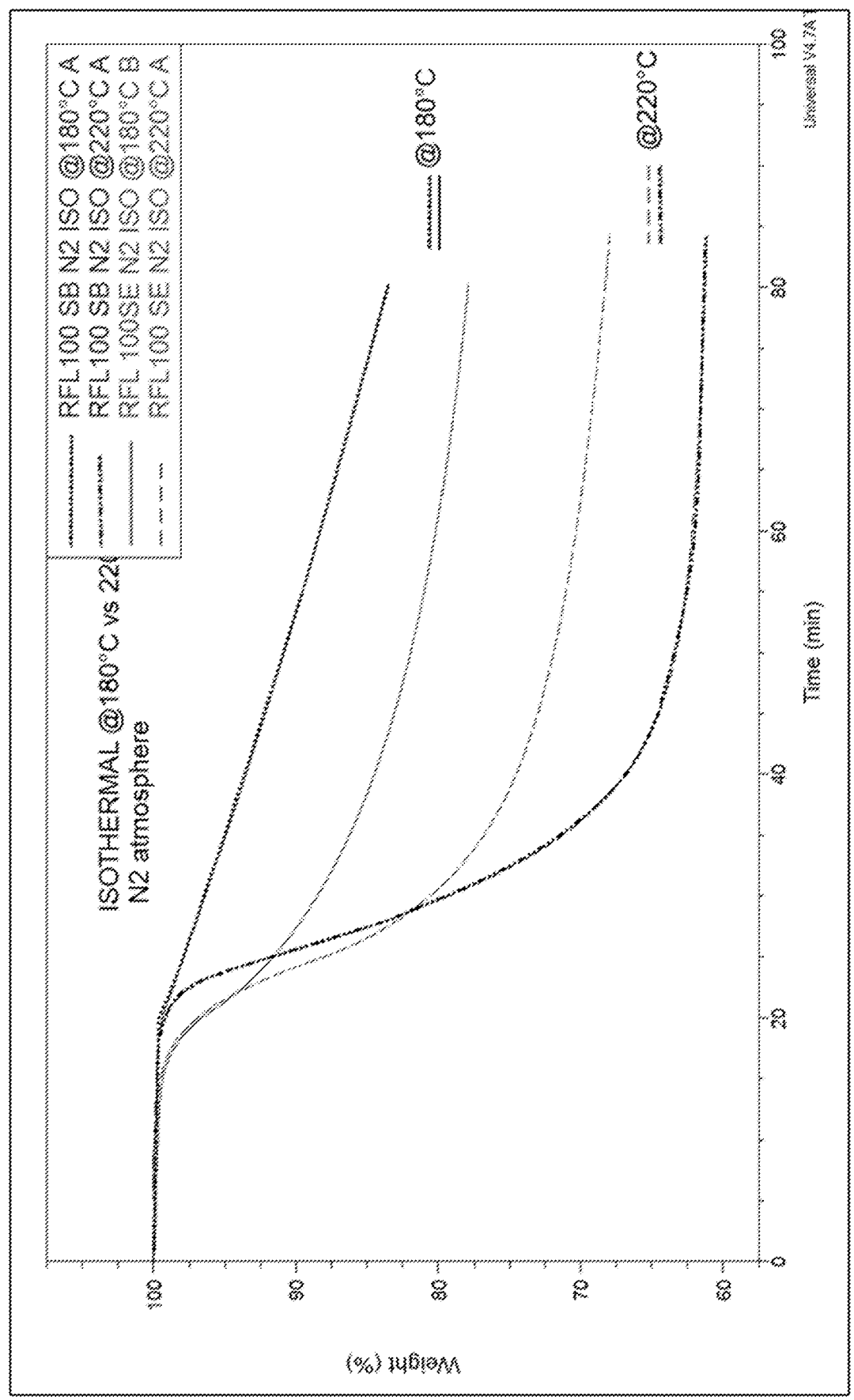

The results of isothermal TGA are better visualized in FIG. 8 where isothermal weight loss curves for analysis at 180° C. and 220° C. are presented. The isothermal weight loss for RFL100SB is reasonably low at 180° C. and significantly high at 220° C. indicating low thermal stability of the material at higher temperatures. In case of RFL100SE, the isothermal weight loss at 220° C. is not very significant compared to 180° C.

The results of isothermal TGA indicates that both Renols are suitable to process with commodity polymers such as PE and PP. The highest processing temperature for these materials is typically around 220° C. In addition, the residence time of the material in the barrel during extrusion processing is generally less than couple of minutes. Therefore, the decomposition of Renols during extrusion processing with PE and PP should be insignificant.

2.4 Differential Scanning Calorimetry (DSC)

Figure 9:
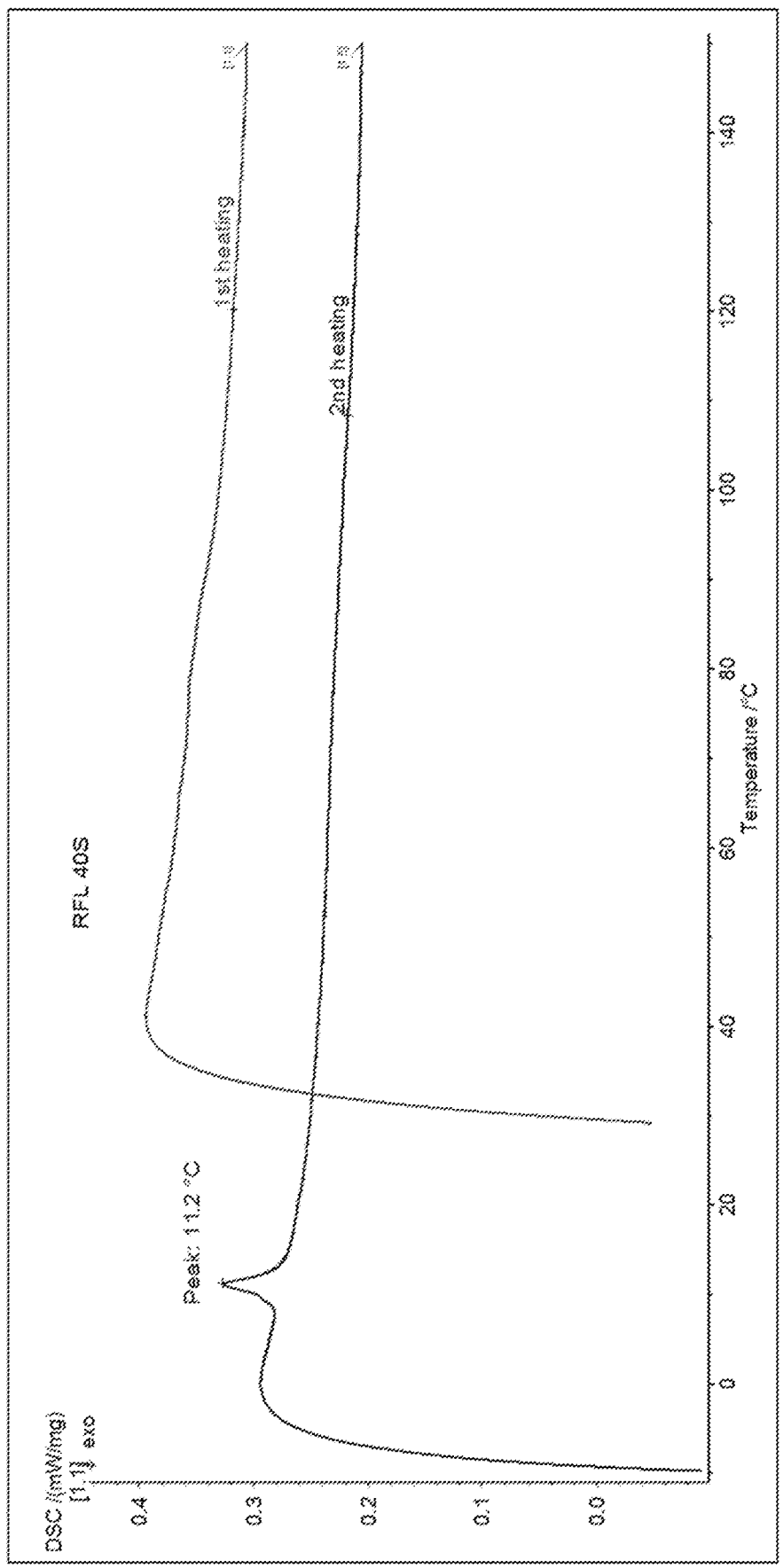

Differential Scanning calorimetry (DSC) analysis was performed on selected Renol samples in order to determine glass transition temperature (if any), melt temperature and crystallization temperature. DSC curve of RFL40S is presented in FIG. 9. No significant transitions were observed in DSC curves but a small peak was observed in second heating curve at around 11° C. however, the responsible transition for this peak is not clear.

Figure 10:
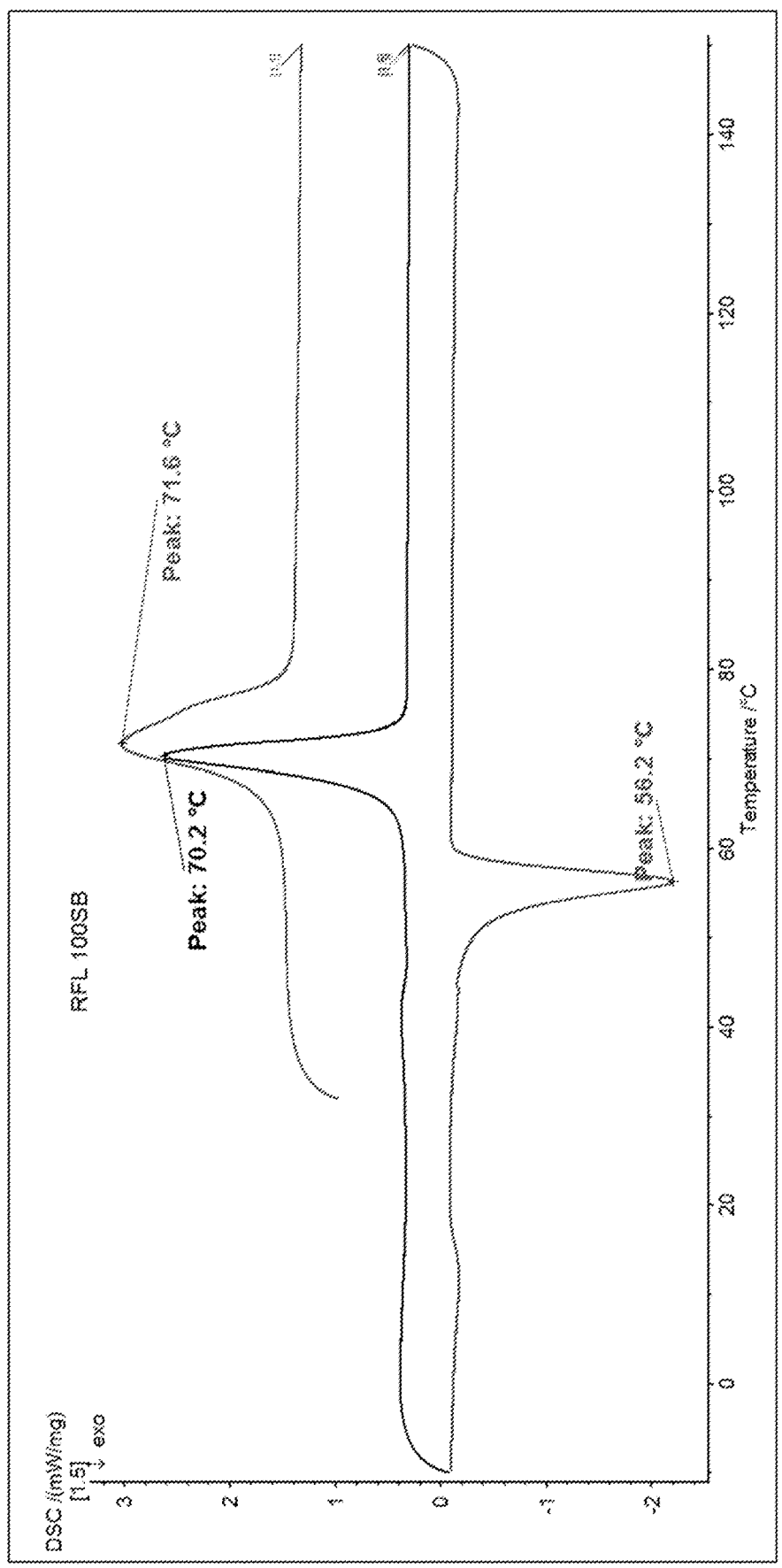
Figure 11:
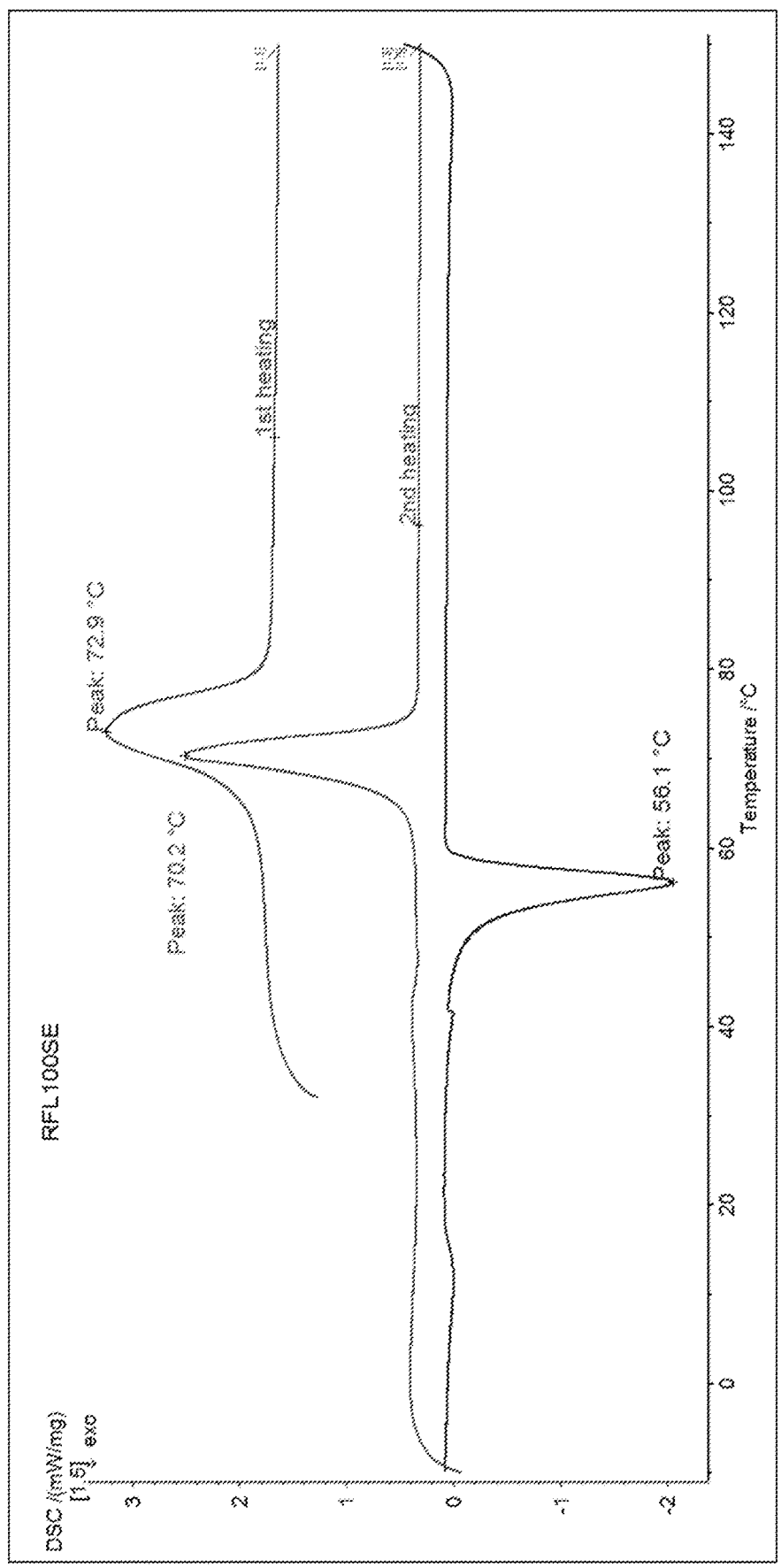
Figure 12:
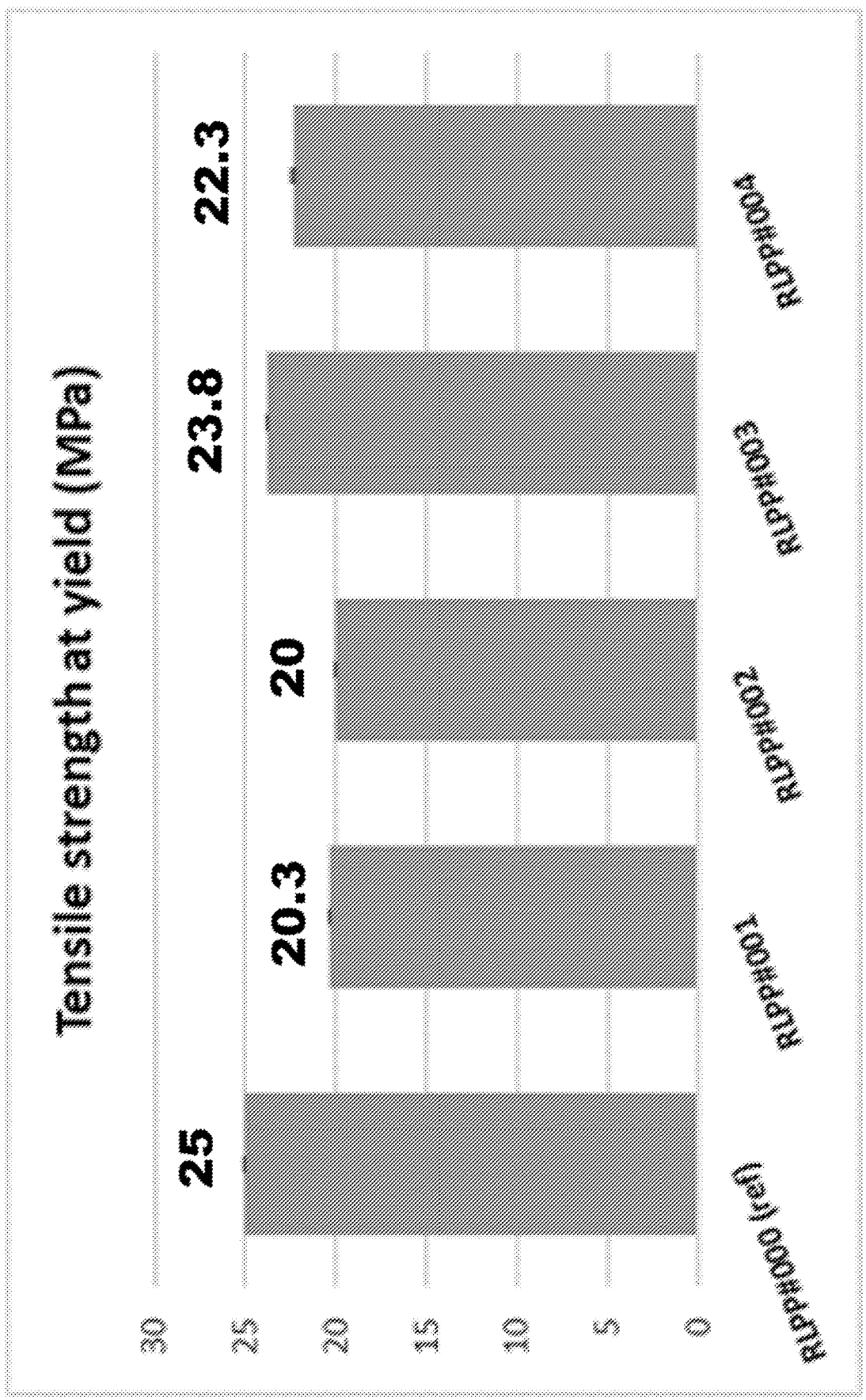

The DSC heating and cooling curves of RFL100SB and RFL100SE-II respectively presented in FIG. 10 and FIG. 11. Both Renol samples presented almost similar curves. No peak was observed for glass transition for both the materials. Unlike RFL40S, RFL100SB and RFL100SE Renol samples observed to be crystalline materials. The samples presented melt temperature at around 70° C. and recrystallization temperature at around 52° C.

TABLE 4

Thermogravimetric analysis results of the ether modified Renols

| Property | Unit | RFL100SE-II |
|---|---|---|
| Temp. at 5% weight loss | °C. | 250 |
| Start of decomposition | °C. | 170 |
| Onset of $1^{st}$ decomposition | °C. | 240 |
| Delta Weight of $1^{st}$ component | Wt % | 15 |
| Onset of $2^{nd}$ decomposition | °C. | 326 |
| Residual @550° C. | Wt % | 34 |

Results:

The weight loss curve of RFL100SE-II are presented in FIG. 4. It is clear from the FIG. 1 that the two parallel samples presented reasonably good reproducibility indicating the RFL100SE-II sample is homogeneous with respect to composition.

Table 1 presents the typical TGA analysis results for ether modified samples.

3. Materials 3.1 Renol Materials

Based on the desktop study and the thermal analysis results, two types of Renol was used
RFL100SB and
RFL100SE-II One kilo of each of the two materials was used and was in completely dried form. No further drying was performed on the received materials.

3.2 Polypropylene (PP) Resin

The polypropylene matrix utilized for the technical study is nucleated heterophasic copolymer "Polypropylene PPC 10641" from Total Polymers. The resin has a melt flow of 44 g/10 min (230° C./2.16 kg) and density of 0.900 g/cm$^3$. The material has a high fluidity, good mechanical properties and is suitable for high speed injection moulding of food packaging. The pellets were milled into a powder and later utilized in producing compounds with Renol samples.

3.3 Compatibilizer

Maleic anhydride grafted polypropylene (MA-g-PP), Exxelor PO 1020 from Exxon Mobil Chemicals was investigated as a compatibilizer in the technical study of developing a polypropylene-Renol composites. Exxelor PO 1020 has high maleic anhydride content with melt flow of 110 g/10 min (190° C./1.2 kg) and density of 0.905 g/cm$^3$. This compatibilizer is designed to develop composites of polypropylene with glass fibre or natural fibres, and the blends of polypropylene with other polar polymers. The compatibilizer is known to improve the interfacial adhesion between polypropylene and reinforcement leading to improved mechanical properties.

3.4 Preparing Material i. Compounding of Renols with PP

Renol samples were compounded into PP by melt extrusion technique. Compositions of the different PP-Renol compounds prepared in this study are presented in Table 5.

Procedure: The required amounts of milled PP, Renol and MA-g-PP are weighed and mixed well by using food processing blender. The mixture was melt extruded using twin screw Prism 16 extruder with L/D is equal to 25. The extrusion was performed at 180° C. and the screw speed of 500 rpm. The polymer string was cooled in water bath and pelletized. The compound pellets were dried at 110° C. for overnight to remove any absorbed moisture from the samples.

ii. Injection Moulding

The dried PP-Renol composite pellets were injection moulded into ISO standard specimens tensile testing and impact testing. Injection moulding was performed on Arburg injection moulding machine under ISO standard recommendations.

iii. Tensile Property Testing

Tensile testing on the PP-Renol composite samples was performed on Zwick Z010 according to ISO 527. A multipurpose type 1B injection moulded dog-bone specimens were utilized for testing. Five parallel measurements were made at room temperature. Tensile properties such as tensile strength, modulus, elongation at yield, etc. were measured from the stress-strain curves.

iv. Impact Strength Testing Charpy impact strength on the PP-Renol samples was measured on Resilvis 125 Cryo according to ISO 179-1. A notched specimen was made from the injection moulded bars and utilized in testing. Five parallel measurements were made at room temperature. Amount of energy absorbed by the sample before it break were measured in addition to recording of type of failure such as C-complete, P-partial, and N-no break.

TABLE 5

Composition of the PP-Renol compounds made

| Sl. No | Sample # | PP resin (wt-%) | Renol type | Renol loading (wt %) | Compatibilizer | Compatibilizer loading (wt-%) |
|---|---|---|---|---|---|---|
| 1 | RLPP#000 (ref) | 100 | NA | — | NA | — |
| 2 | RLPP#001 | 78 | RFL100SB | 20 | Eelor 1020 | 2 |
| 3 | RLPP#002 | 80 | RFL100SB | 20 | NA | — |
| 4 | RLPP#003 | 78 | RFL100SE-II | 20 | Eelor 1020 | 2 |
| 5 | RLPP#004 | 80 | RFL100SE-II | 20 | NA | — |

*Sl = sample, PP = polypropylene 3.5 Results and Discussion

All composite samples had a loading of 20 wt % Renol which was considered a "safe" filler loading. The main parameter that was varied was the compatibilizer. The purpose was to evaluate
fit for processing
need for compatibilizer 3.5.1 Processing Compounding trials of PP with Renol went smooth. No considerable viscosity build-up in extruder screw barrel and hence no increase in temperature in screw barrel was observed. In general, processing of plastics with fillers leads to high shear forces in the barrel which leads to increase in temperature of the barrel and difficulty in processing. However, during processing of Renols with PP no such observations were made. The PP-Renol composite pellets are obtained as brown coloured pellets obtained on compounding of PP with Renol. The brown colour on the PP-Renol compounds with RFL100SB were slightly less compared to the pellets obtained with RFL100SE-II.

In order to investigate the mechanical properties of PP-Renol composite samples, the pellets were injection moulded into standard ISO dog-bone shaped specimens. When the specimens were closely observed, the dark colouration of PP-Renol composites in RFL100SE are less intense compared to RFL100SB (contrary to pellets). The test bars were homogeneously coloured (visual observation).

3.5.2 Mechanical Properties

Figure 13:
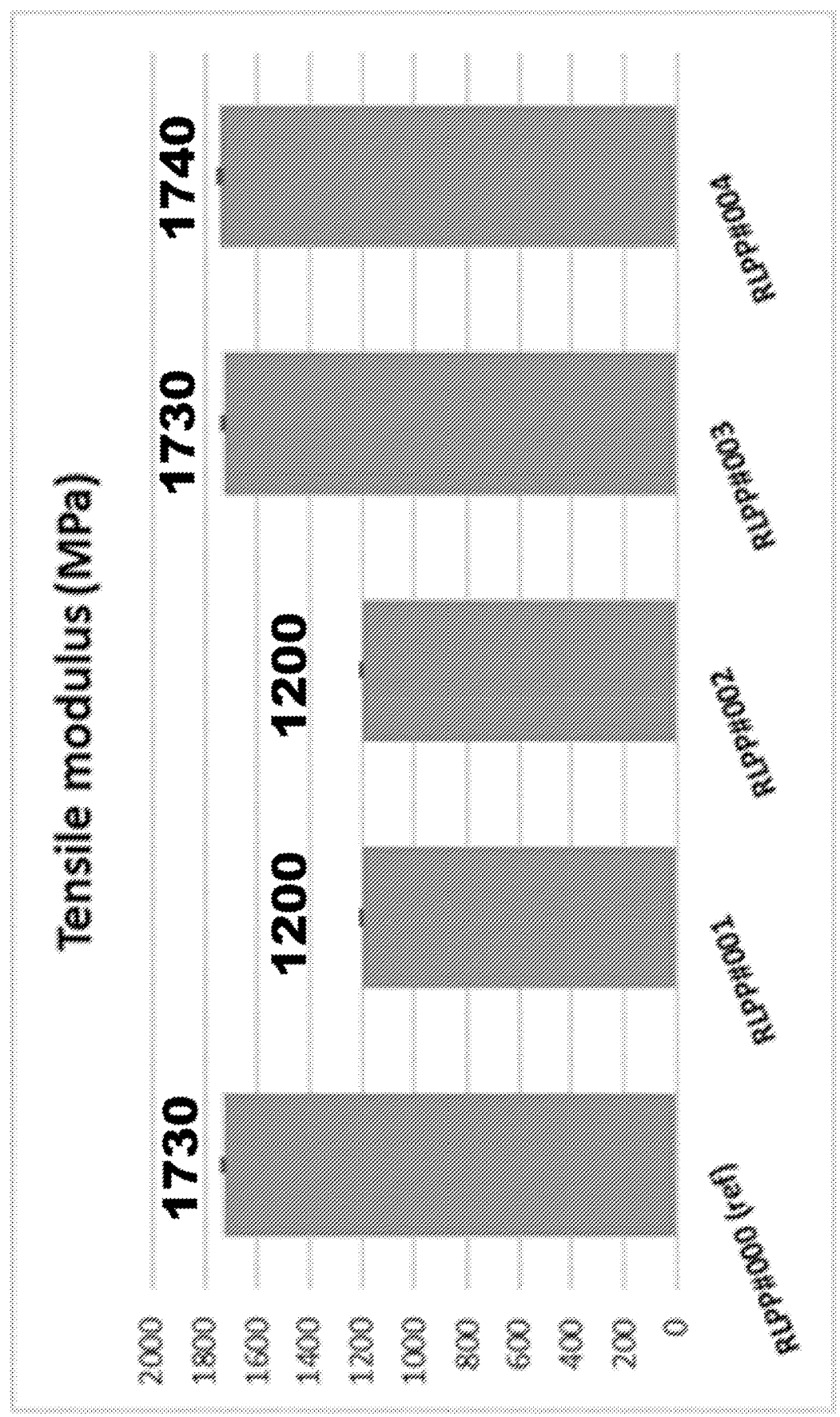
Figure 14:
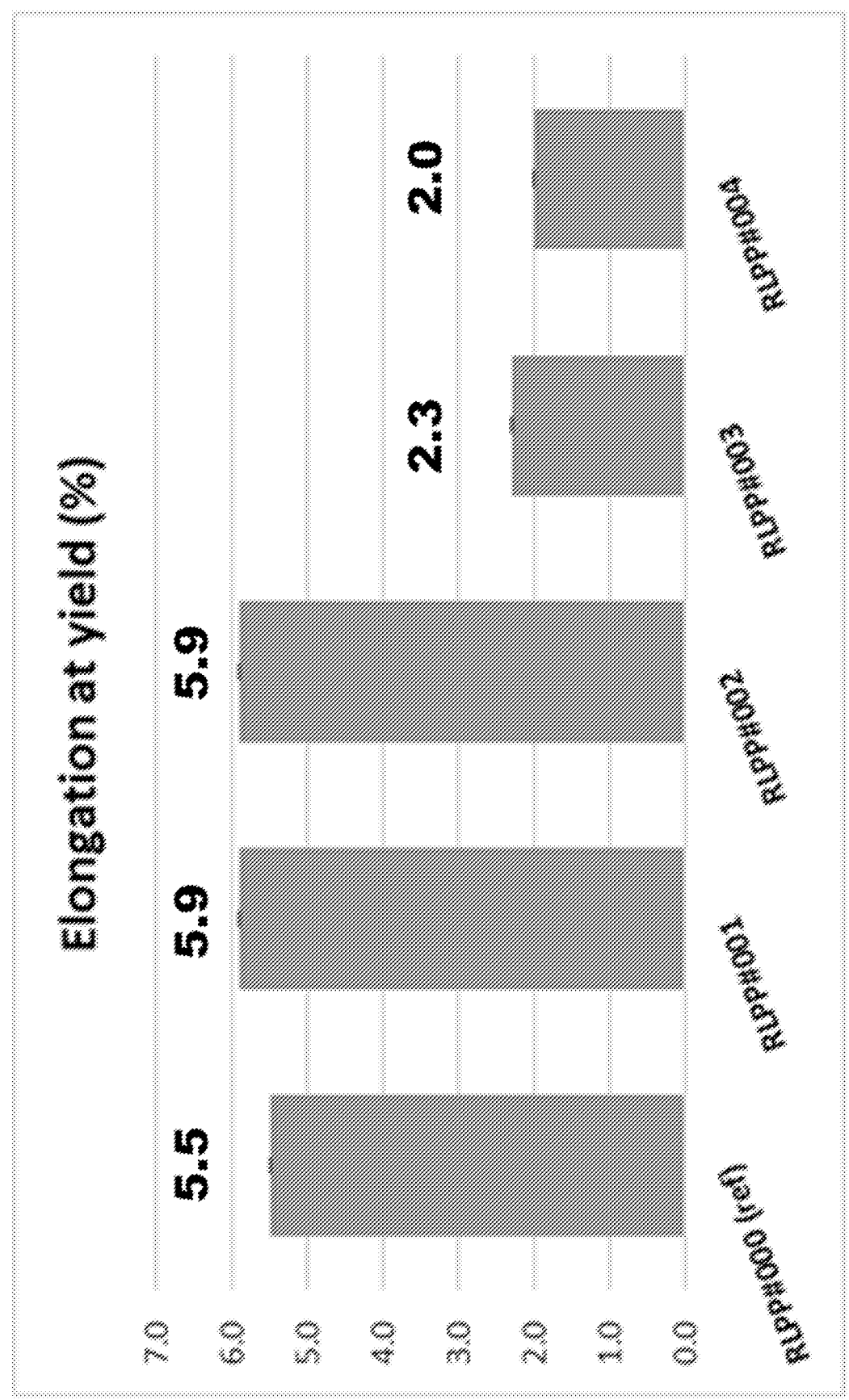

The tensile properties are shown in Table 6. Variation of tensile strength, modulus and elongation at yield for different samples respectively presented in Figure, FIG. 13 Figure. The tensile strength of PP-Renol samples is slightly lower than (about 20%) the reference PP sample. Among the two types of Renols, ether-modified lignin presented slightly better tensile properties compared to ester-modified Renols. MA-g-PP compatibilizer has no or very little influence on the tensile strength PP-Renol samples. The tensile modulus of PP-ester Renol samples is lower than (about 30%) the reference PP. In case of ether-modified Renol-PP, the tensile modulus was in the order of reference PP. No influence of compatibilizer on tensile modulus was observed. The elongation at yield for PP-ester Renols is in the order of PP whereas PP-ether Renols was lower than (up to 74%) reference PP. The influence of compatibilizer on elongation properties was not significant.

TABLE 6

Tensile modulus, tensile strength and elongation at yield of PP and PP-Renol compounds

| Sl. No | Sample # | Renol type | Tensile modulus (MPa) Value | STD | Tensile strength at yield (MPa) Value | STD | Elongation at yield (%) Value | STD |
|---|---|---|---|---|---|---|---|---|
| 1 | RLPP#000 | None | 1730 | 6 | 25.0 | 0.0 | 5.5 | 0.0 |
| 2 | RLPP#001 | Ester-modified | 1200 | 3 | 20.3 | 0.0 | 5.9 | 0.0 |
| 3 | RLPP#002 | Ester-modified | 1200 | 4 | 20.0 | 0.0 | 5.9 | 0.0 |
| 4 | RLPP#003 | Ether-modified | 1730 | 5 | 23.8 | 0.0 | 2.3 | 0.0 |
| 5 | RLPP#004 | Ether-modified | 1740 | 5 | 22.3 | 0.1 | 2.0 | 0.0 |

Figure 15:
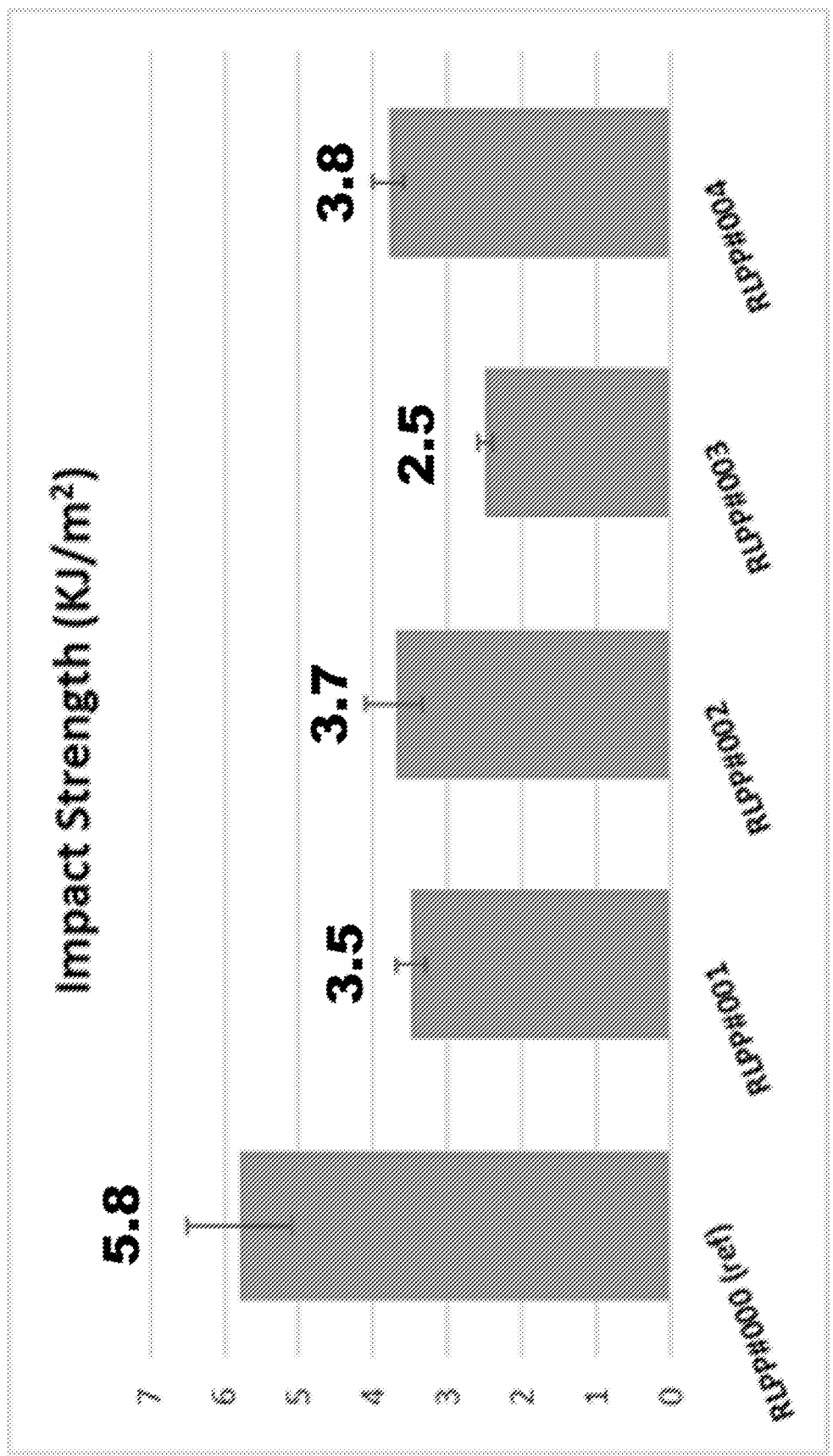

Impact properties of reference PP and PP-Renol compounds are presented in 7 and FIG. 15. Impact properties of PP-Renol are lower than (up to 57%) the reference PP. Utilization of MA-g-PP compatibilizer in PP-Renols slightly reduces the impact properties.

TABLE 7

Impact strength of reference PP and PP-Renol compounds

| Sl. No | Sample # | Impact strength @23° C. (KJ/m$^2$) Value | STD | Comment on failure |
|---|---|---|---|---|
| 1 | RLPP#000 | 5.8 | 0.7 | Complete break |
| 2 | RLPP#001 | 3.5 | 0.2 | Complete break |
| 3 | RLPP#002 | 3.7 | 0.4 | Complete break |
| 4 | RLPP#003 | 2.5 | 0.1 | Complete break |
| 5 | RLPP#004 | 3.8 | 0.2 | Complete break |

4. Injection Moulding

A PP-Renol compound was made in 2.5 kg quantity for the recipe RLPP #002. As described in the earlier section, PP-Renol compound was produced by melt extrusion process. Milled PP and Renol was physically mixed first and later compounded in Prism 16 twin screw extruder. The resulting compound was injection moulded into a box/cup in both natural colour and green colour in Angel injection moulding machine. In order to produce cup in green colour, the PP-Renol compound was mixed with 5 wt-% green colour masterbatch based on polyethylene carrier and later injection moulded at 200° C. The demonstrator processing went very smooth. However, the smell of the boxes was slightly higher than the smell of the pellets produced during extrusion processing and test specimens produces by injection moulding. This strong smell of boxes could be due to slightly higher processing temperature (200° C.) compared to compounding temperature (180° C.).

5. Polyester and Modified Lignin

A granular sample of PET (1.60 g, Aldrich Chemistry prod. nr.: 429252), containing 30% glass particles as reinforcer, was melted under argon in a liquid sand bath at 280° C. To the melt was modified lignin (178 mg) obtained from Example 1.4 above added and mixed for 3 minutes. On cooling a uniform material was obtained.

6. Polyester and Modified Lignin

A sample of PET (1.60 g, from a soft drink bottle) was melted under argon in a liquid sand bath at 280° C. To the melt was added modified lignin (400 mg) obtained from Example 2 above added and mixed for 3 minutes. On cooling a uniform material was obtained.

7. Polynitrile and Modified Lignin

Modified lignin (obtained from Example 1.4 above), 40 mg, was mixed with 40 mg PAN (polyacrylonitrile) and 0.7 ml DMF and left during stirring at room temperature overnight. DMF was distilled off at 100° C. and vacuum (20 mbar).

The invention claimed is:

1. A polymeric material comprising a first polymer and a second polymer wherein the first polymer is a natural or a synthetic polymer and the second polymer is modified lignin;
   wherein the modified lignin is modified with an alkyl containing group via a linker wherein the linker is an ether group linking a secondary carbon of the alkyl containing group to the modified lignin and wherein the alkyl containing group is derived from fatty acid methyl ester.

2. The material according to claim 1 wherein the amount of modified lignin is 1-99 wt %.

3. The material according to claim 1 wherein the first polymer is a polyolefin.

4. The material according to claim 3 wherein the polyolefin is polyethylene or polypropylene.

5. The material according to claim 1 wherein the first polymer is a polyester.

6. The material according to claim 1 wherein the first polymer is a polynitrile, or a polycarbonate.

7. The material according to claim 3 wherein the amount of the first polymer is 1-99 wt %.

8. The material according to claim 1 wherein alkyl group is a C4 or longer.

9. The material according to claim 1 wherein the modified lignin is further alkylated via an ester group.

10. The material according to claim 1 wherein the modified lignin is thermally stable at temperatures up to 150° C.

11. The material according to claim 1 wherein the lignin is Kraft lignin.

12. The material according to claim 1 wherein the material does not contain any additional compatibilizer.

13. The material according to claim 2 wherein the amount of modified lignin is 3 wt % or more and 90 wt % or less.

14. The material according to claim 7 wherein the amount of the first polymer is 3 wt % or more and 90 wt % or less.

15. The material according to claim 8 wherein alkyl group is C6 or longer.

16. The material according to claim 15 wherein alkyl group is C8 or longer.

17. The material according to claim 16 wherein alkyl group is C10 or longer.

18. The material according to claim 17 wherein alkyl group is C12 or longer.

19. The material according to claim 18 wherein alkyl group is C14 or longer.

20. The material according to claim 19 wherein alkyl group is C16 or longer.

21. A method of extruding the material according to claim 1 comprising:
   mixing the first polymer and the second polymer and optionally a compatibilizer wherein the first polymer is a natural or a synthetic polymer and the second polymer is modified lignin; and
   extruding the formed mixture at a temperature of at least 100° C., preferably at least 170° C. or at least 180° C.; and
   optionally cutting the extruded material into pellets.

22. A method of injection moulding a product of the material according to claim 1 wherein the method comprises:
   providing pellets or powder of the material according to claim 1; and
   injection moulding the pellets or powder into a desired shape at a temperature of at least 100° C.

23. The method of claim 21, wherein the formed mixture is extruded at a temperature of at least 170° C.

24. The method of claim 23, wherein the formed mixture is extruded at a temperature of at least 180° C.

25. The method of claim 23 wherein the pellets or powder is injection moulded at a temperature of at least 180° C.

* * * * *